United States Patent [19]

Lee et al.

[11] 4,305,281

[45] Dec. 15, 1981

[54] SELF-CORRECTING SELF-CHECKING TURBINE METER

[75] Inventors: Winston F. Z. Lee, Delmont; Raymond V. White; Felice M. Sciulli, both of Pittsburgh, all of Pa.; Andrew Charwat, Los Angeles, Calif.

[73] Assignee: Rockwell International Corporation, Pittsburgh, Pa.

[21] Appl. No.: 45,532

[22] Filed: Jun. 4, 1979

[51] Int. Cl.³ ............................................... G01F 1/12
[52] U.S. Cl. .................................... 73/195; 73/861.84
[58] Field of Search .................. 73/195, 196, 230, 231, 73/861.83, 861.84

[56] References Cited

U.S. PATENT DOCUMENTS

| | | | |
|---|---|---|---|
| 3,043,140 | 7/1962 | Waugh et al. | 73/230 |
| 3,142,179 | 7/1964 | Souriau | 73/231 |
| 3,686,948 | 8/1972 | Lahaye | 73/230 |
| 3,710,622 | 1/1973 | Hammond | 73/231 |
| 3,735,637 | 5/1973 | Penet | 73/861.84 |
| 3,934,473 | 1/1976 | Griffo | 73/231 |
| 4,091,653 | 5/1978 | Lee | 73/231 |

FOREIGN PATENT DOCUMENTS 187340 11/1966 U.S.S.R. ............................... 73/230

Primary Examiner—Herbert Goldstein

[57] ABSTRACT

A turbine meter is disclosed in which a sensing rotor downstream from the metering rotor senses changes in the exit angle of the fluid leaving the metering rotor, the output from the sensing rotor being combined with the output from the metering rotor to produce a corrected output indicative of the flow of fluid through the meter. The output from the sensing rotor and the output from the metering rotor may be compared to provide an indication of deviation from performance at calibration.

54 Claims, 27 Drawing Figures

SELF-CORRECTING SELF-CHECKING TURBINE METER

FIELD OF INVENTION

This invention relates to turbine meters of the type shown in U.S. Pat. No. 3,733,910 and is particularly concerned with apparatus and methods of ascertaining and maintaining the accuracy of such turbine type flow meters.

BACKGROUND OF THE INVENTION

Turbine type flow meters have been used for many years in the measurement of fluids and this type of metering has become increasingly popular because of its simplicity, repeatability, reliability and the relatively greater accuracy which turbine meters provide over other forms of meters particularly at large quantities of flow.

It is generally understood in the art that each meter which is manufactured and assembled in accordance with conventional methods has its own unique registration or calibration curve. At the time of manufacture the actual flow through the meter is determined by a flow prover placed in a series in the test line with the meter being calibrated. A flow prover is a highly accurate instrument which itself has been calibrated to measure to a high degree of accuracy the quantity of flow. Meters produced by conventional manufacturing methods will each show a slightly different quantity of flow for the same quantity as shown by the flow prover. This is caused by a number of factors. For example, the different sets of bearings in one meter may impose a slightly different drag on the rotation of its rotor than the bearings in other meters will impose on the rotors with which they are associated. Also the angles at which the blades are oriented with respect to the direction of fluid flow may vary slightly from meter to meter as will the area of annular flow passage through which the fluid flows as it passes through the meter. As a practical matter, it is impossible under conventional production methods to maintain the effect of these factors precisely the same from meter to meter. Also, the mechanical load imposed on the meter by the various drive elements such as gears, magnetic coupling, and so forth between the rotor itself and the registering mechanism will also vary from meter to meter. Thus, variations in these factors from meter to meter result in each meter having a unique value of flow through the meter for a given quantity of flow as measured by the prover. The ratio of the meter reading at any given rate of flow to the prover reading is referred to as the "percentage of registration." Thus, a meter which shows a registration of flow of 999 cu. ft. of flow when the prover shows a flow quantity of 1,000 cu. ft. is said to have a registration of 99.9%; that is, it registers 99.9% of the fluid which actually flowed through the meter. The curve produced by plotting the percentage of registration of a meter at various rates of flow throughout its stated range of operation in terms of flow rates is called the calibration curve and each meter has essentially its own unique calibration curve.

In the field, therefore, if after a given period of time the meter shows on its indicator a quantity of 10,000 cu. ft. of fluid having flowed through the meter at a given flow rate and if at that flow rate the percentage of registration is 99.9%, the actual flow through the meter is 10,000 divided by 0.999 or 10,010 cu. ft. of fluid. As stated above since the calibration curve shows the percent of registration for the various flow rates throughout the operating range of the meter, by dividing the value shown on the meter register by the percentage of registration as shown on the calibration curve, for that meter at the flow rate the system was operating, the actual flow through the meter can be calculated.

In the course of the extended field use of the meter, any one or more of the factors mentioned above which influence the calibration curve can change. For example, the rotor bearings may wear due to their continuous use, resulting in much larger bearing friction than when they were new, foreign material in the fluid being metered can become lodged in the bearings, or the annual flow area may change because of the accumulation of foreign matter, causing a change in the influence which those particular factors have on the amount the meter shows on its register for given amount actually passed through the meter. For example, if the bearing friction has increased due to continuous use to impart a considerably greater load on the rotor, then instead of registering 99.9% registration in the example given above, the register on the meter may show only 98.9% of the fluid actually passed through the meter. In such a case the meter would register 1.1% less than 10,000 or 9,890 cu. ft. Since the operators have no indication that the meter is not operating in accordance with its calibration curve, the reading of 9,890 would be divided by the normal percentage of registration figure of 99.9% which would give a spurious result of $(9890/0.999) = 9900$ cu. ft.

In the past it has been the practice to periodically remove the meter from the line and to recheck it and recalibrate it against the standard of a meter prover. This, of course, requires considerable time and expense and often results in the meter being operated while out of calibration for extended periods of time between calibration checks. In U.S. Pat. No. 4,091,653 assigned to the assignee of the present invention, a method and apparatus is disclosed for checking the accuracy and calibration of a turbine meter without removing the meter from the line and without the need of interrupting its normal service. As described in that patent, it has been found that changes in the calibration or the percentage of registration of the meter result in changes in the angle at which the fluid exits from the blades of the metering rotor. Thus, if at the time of original calibration the exit angle of the fluid leaving the rotor is noted and specified, by periodically checking the exit angle of the fluid while the meter is in service any deviations in the exit angle of the fluid from that specified at the time of original calibration will indicate to the operator that the meter calibration has changed. That patent disclosed means provided within the meter to provide an indication of the exit angle of the fluid. The instant invention is an improvement to the invention disclosed in that patent and provides a means of continuously monitoring the exit angle of the fluid so that when changes in the exit angle are sensed these changes are used to correct the registered quantity of fluid in accordance with such changes to provide a continuous and accurate registration of the flow thru the meter.

Prior attempts to achieve high accuracy in turbine meters are shown in the U.S. Pat. No. to Souriau 3,142,179 and the U.S. Pat. No. to Griffo 3,934,473. The patent to Souriau discloses a turbine meter in which the fluid entering the meter is given a tangential velocity by means of fixed angularly oriented vanes. The fluid which then has a tangential velocity component impinges on the vanes of a metering rotor causing it to rotate. According to the teachings of that patent the meter operates at greatly enhanced accuracy when the tangential velocity component is completely removed by the metering rotor. A brake is provided which is adapted to apply a braking torque to the metering rotor the magnitude of the torque being adjustable by rotation of a sensing rotor which is provided downstream of the metering rotor. If the fluid leaving the blades of the metering rotor has any tangential velocity component left which has not been removed by the metering rotor, the sensing rotor will be caused to rotate. Rotation of the sensing rotor varies the amount of braking effort which is applied to the metering rotor until the metering rotor is rotating at a speed at which all of the tangential velocity component is removed from the fluid exiting from the blades of the metering rotor. In the present invention no tangential component is imparted to the fluid entering the metering rotor vanes and no attempt is made to remove the tangential component of velocity of the fluid leaving the metering rotor blades.

The patent to Griffo discloses a turbine meter in which a sensing rotor downstream from the metering rotor is adapted to rotate in a direction opposite from the direction of rotation of the metering rotor at approximately the same speed as the metering rotor, the speed of the sensing rotor varying with changes in the speed of the metering rotor. In accordance with the invention disclosed herein it is shown to be advantageous for the sensing rotor to operate in the same direction as the metering rotor at a considerably reduced speed.

Other patents typical of efforts to enhance the accuracy of turbine meters are the U.S. Pat. Nos. to Allen 3,241,366 and Hammond et al. 3,710,622.

OBJECTS OF THE INVENTIONS

It is an object of this invention to provide novel apparatus and methods which are practical, simple, reliable and highly accurate within wide range of pressure and flow rates for continuously maintaining the accuracy of a turbine type flow meter while the meter remains in service.

It is also our object of this invention to provide novel means and methods for continuously maintaining the corrected registration of the fluid flow through the meter and for continuously indicating the amount of deviation of the metering rotor registration from its calibration or any other reference value.

It is another object of this invention to provide means for continuously monitoring the exit angle of the fluid flow from the metering rotor and correcting the registered quantity of fluid flow in accordance with any changes in the exit angle of the fluid to thereby provide an accurate registration of the flow through the meter.

It is yet another object of the invention to provide apparatus by means of which the accuracy of the registered amount of fluid passed through the meter is maintained while giving an indication of the amount of departure of the exit angle from the initial calibrated value.

It is still another objective of the present invention to provide a novel method and apparatus which provides a measurement of a variable which may be compared with a reference value to determine whether the accuracy of the meter has been changed and also its amount, and means for effecting a correction of the registered value in accordance with changes in the variable.

It is still another object of this invention to provide an indication when the meter is out of calibration and the amount of deviation from calibration.

DESCRIPTION OF THE VARIOUS EMBODIMENTS

Figure 3:
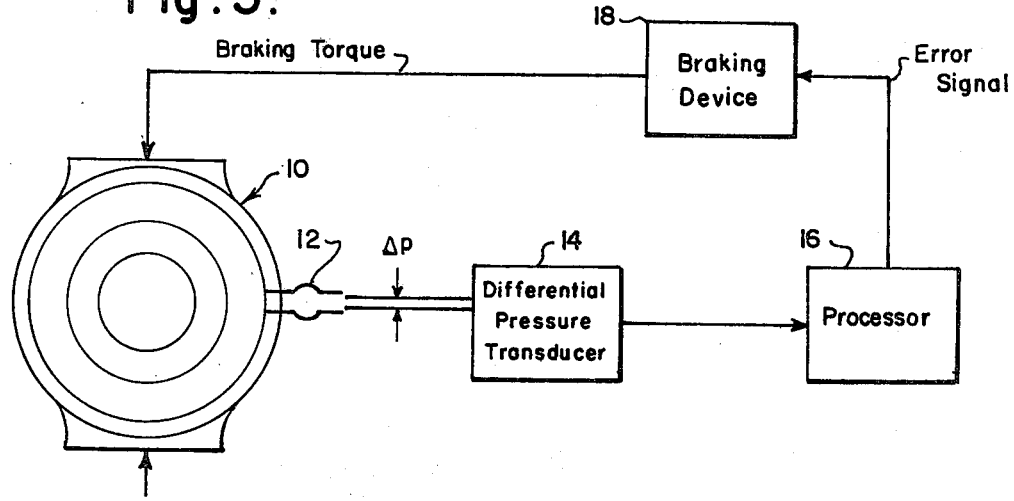
FIG. 3 is a diagram of an embodiment of a constant accuracy turbine meter, using the flow direction-detecting pitot tube of U.S. Pat. No. 4,091,653 as a sensing means.

As disclosed in U.S. Pat. No. 4,091,653 the disclosure of which is hereby incorporated herein, changes in the angle at which the fluid flowing through the meter exits from the metering rotor (said angle herein designated $\theta$) are indicative of the changes in the meter registration. In the invention of that patent, the exit angle was merely indicated on a display to provide a basis for correcting the total flow through the meter as indicated on the meter register. FIG. 3 hereof shows a system whereby the exit angle is monitored and maintained at a fixed value.

A flow direction-detecting pitot tube 12 similar to that disclosed in U.S. Pat. No. 4,091,653 is located downstream from its metering rotor 20, as shown in said patent and in FIG. 3 hereof. At the time of initial calibration the tube 12 is adjusted to a position commensurate with a desired exit angle $\theta$ and will therefore produce no output signal in the form of pressure differential $\Delta p$ when the exit angle $\theta$ is at this value. When, however, in the course of service the exit angle $\theta$ deviates from its value at initial calibration, the pitot tube will produce a pressure differential which varies with the amount of deviation $\Delta \theta$. This pressure differential $\Delta p$ which is representative of any deviation $\Delta \theta$ of the exit angle $\theta$ from its calibrated value $\theta^*$ is impressed on differential pressure transducer 14 as shown in FIG. 3. Transducer 14 converts the pressure differential $\Delta p$ into an electronic error signal which varies directly with changes in the pressure differential and, therefore, changes $\Delta \theta$ in the exit angle. Thus, $$\Delta p \alpha \Delta \theta \alpha \text{Error Signal}$$

The deviation or error signal is then applied to a processor 16 where it is amplified and otherwise processed to condition it for application to a braking device 18. The braking device 18 functions to apply a braking effort to the metering rotor, the amount of which effort is determined by the error signal input to the processor. Therefore, if in the course of service the rate of rotation of the metering rotor 20 at a given fluid flow rate is caused to slow down because of bearing wear or other reasons, the exit angle $\theta$ of the fluid will increase which will cause the pitot tube 12 to apply a pressure differential which is sensed by transducer 14 as a positive pressure. The output from the transducer 14 and processor 16 which is representative of the change in the exit angle $\theta$ is applied to the braking device 18 which then functions to lessen the braking effort applied to the metering rotor 20, resulting in an increase in metering rotor speed and a decrease in exit angle $\theta$. The initial adjustment in the braking force may not be sufficient to return angle $\theta$ to its calibrated value. If not, $\Delta p$ and the error signal from the transducer will persist causing the processor to make a series of successive adjustments. The meter 10 will again register the fluid flow accurately within the limits of its original calibrated value. From the foregoing it will be appreciated that the braking device 18 must function to apply a definite braking effort on the metering rotor 20 at all times even when the meter 10 is in calibration and operating within permissible limits of deviation in value of the exit angle $\theta$ from the calibrated value $\theta^*$.

If for any reason the speed of the metering rotor 20 should increase for a given flow rate over its speed at calibration, the exit angle $\theta$ will decrease which will cause the pitot tube 12 to apply pressure differential which is sensed by transducer 14 as a negative pressure, resulting in negative values of the outputs from the transducer 14 causing processor 20 to decrease its output signal to cause the braking device 18 to increase braking effort applied to the metering rotor 20, the speed of which will then be reduced to its original calibrated value and the decreased exit angle will be nullified to yield zero error signal.

The foregoing describes an arrangement whereby the operation of a turbine meter 10 is adjusted in accordance with deviations in the speed of its metering rotor from its speed at the time of calibration so that its output will always be accurate within the limits of its initial calibration.

As described, deviations from calibrated operation are reflected in changes in the exit angle $\theta$ of the fluid leaving the metering rod 20 which changes are sensed by a flow direction-detecting pitot tube. One disadvantage in utilizing a pitot tube to sense changes in the exit angle is that the spaced openings and passages in the pitot tube as described in U.S. Pat. No. 4,091,653 tend to become obstructed by foreign particles in the fluid being metered especially if the pitot tube is to be left in the flow stream for continuous use.

It has been found that a second rotor 22 mounted for free rotation at a proper distance downstream of the metering rotor 20 may be used to sense changes in the exit angle of the fluid leaving the metering rotor in a manner hereinafter described.

Figure 1:
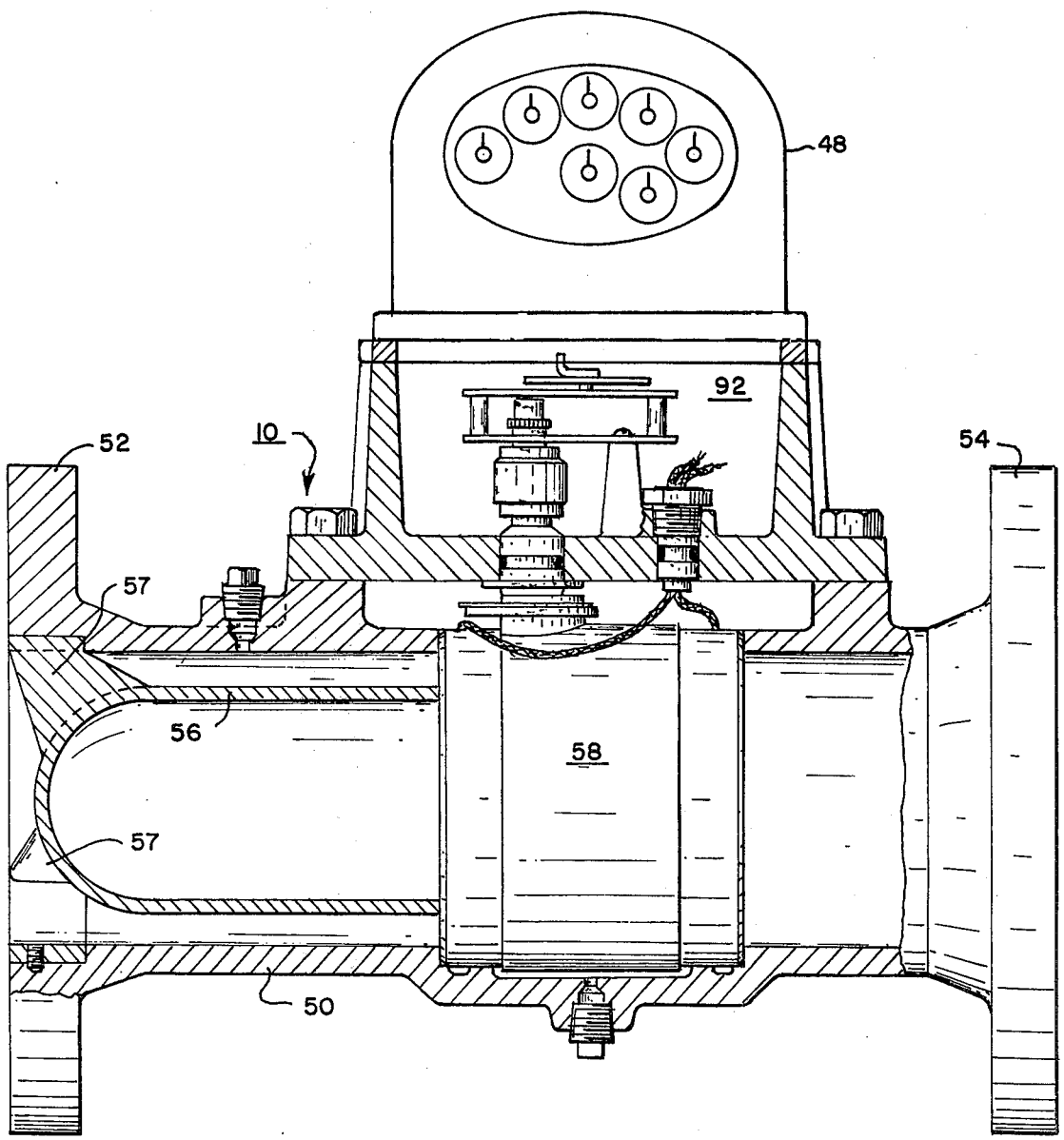
FIG. 1 is a side view of a turbine meter, with a portion of the housing broken away to show the measuring chamber and other details.
Figure 2:
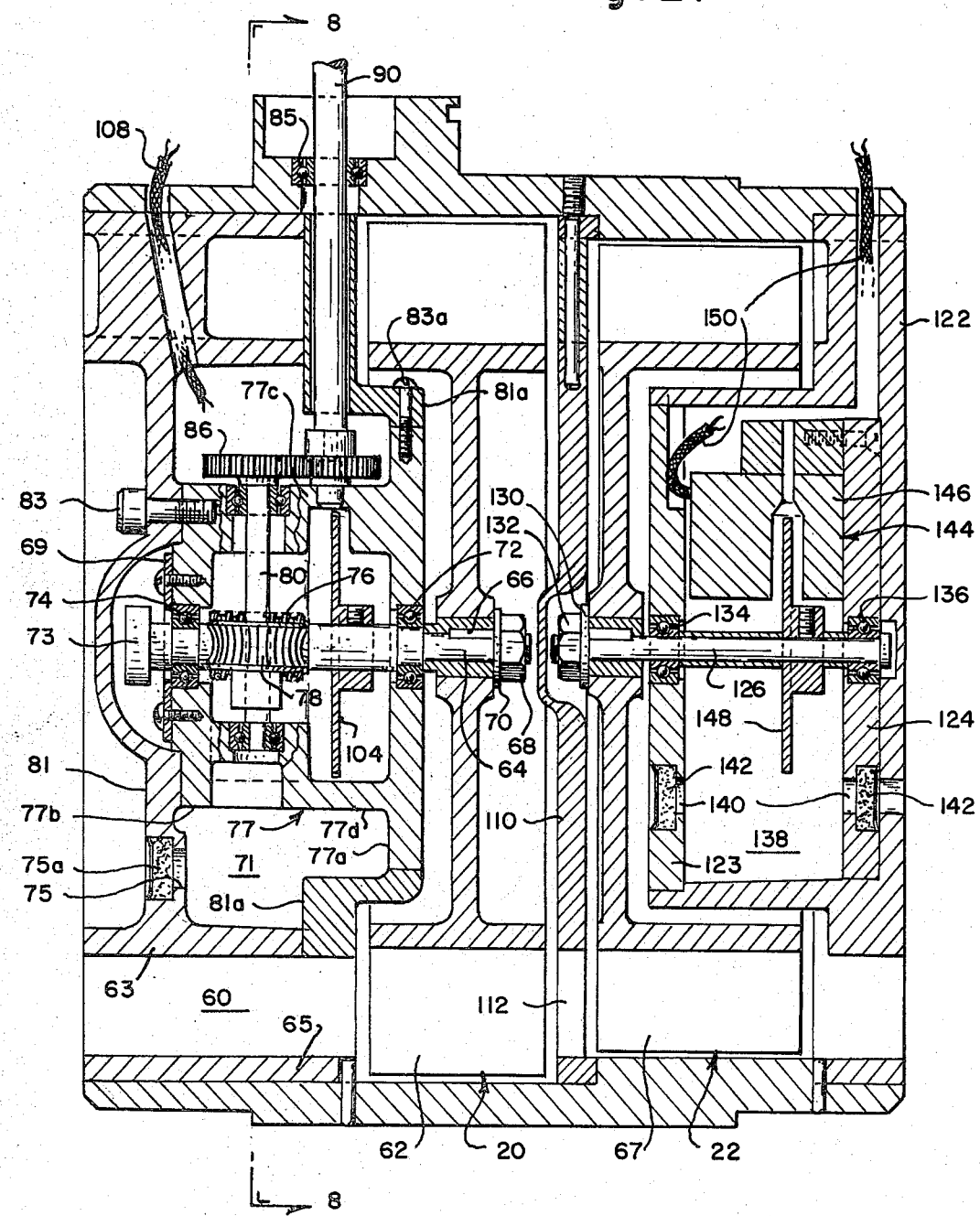
FIG. 2 is a longitudinal sectional view of the measuring chamber.
Figure 8:
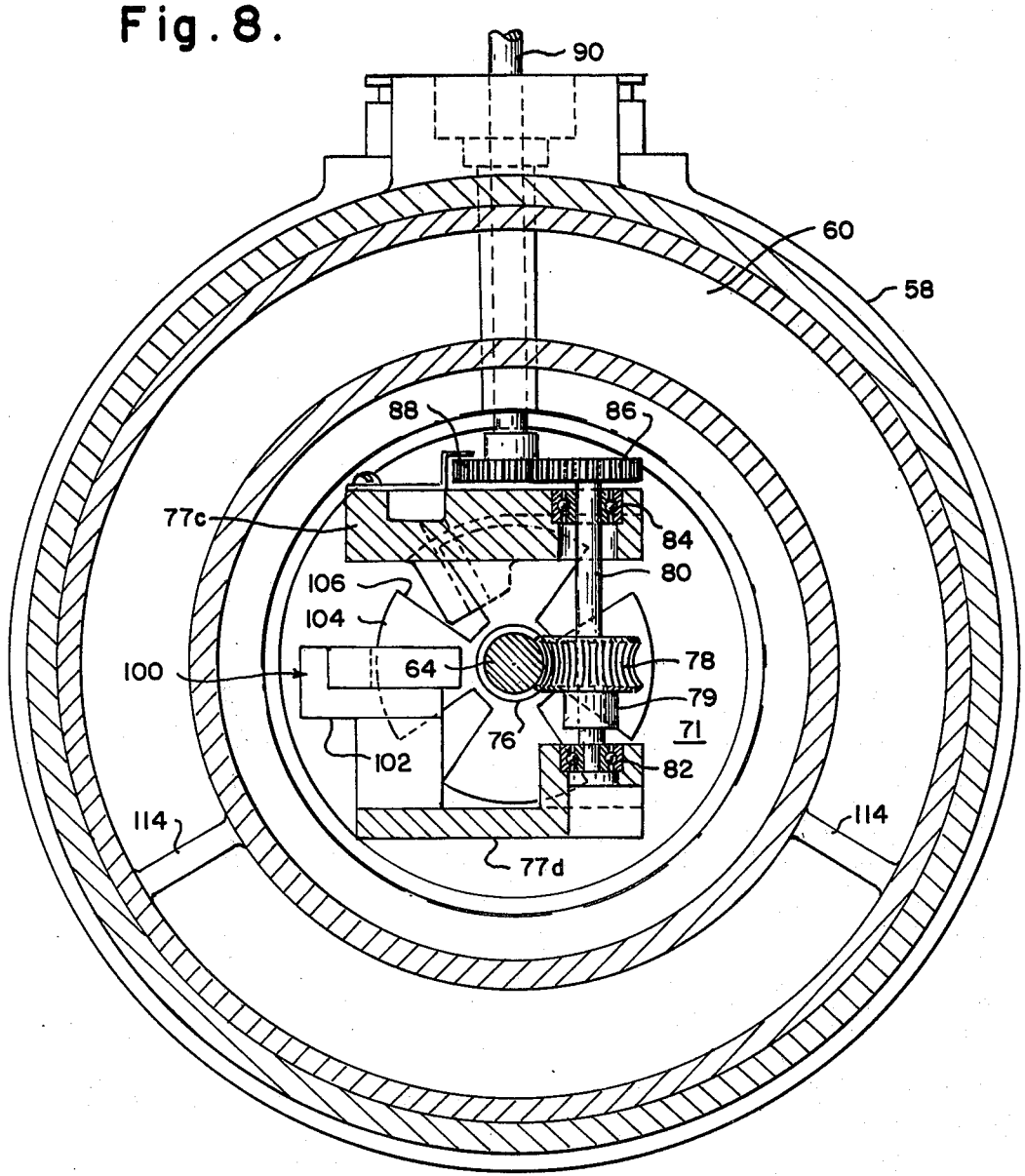
FIG. 8 is a section along 8—8 of FIG. 2.

FIGS. 1, 2 and 8 show the internal details of a turbine meter 10 having its sensing rotor 22 downstream of its metering rotor 20 to sense the exit angle $\theta$ of the fluid leaving the metering rotor 20. Turbine meter 10 has a housing 50 with flanges 52 and 54 at the inlet and outlet ends, respectively, for connection into a fluid flow line. Upstream of measuring chamber 58 is a flow guide 56 which is supported from housing 50 by radially extending vanes 57. In addition to supporting guide 56, the vanes 57 serve to eliminate or minimize any tangential components in the direction of fluid flow before it enters measuring chamber 58. Measuring chamber 58 is comprised of inner and outer concentric cylindrical walls 63 and 65 held together by spaced radial struts 114 to form annular passage 60, and is designed to fit into housing 50 in a suitable fluid-tight manner, so that all the fluid flows through the annular passage 60 (FIGS. 2 and 8) of the chamber. Inside measuring chamber 58, metering rotor 20 is mounted with radially-projecting blades 62 completely spanning flow passage 60. Rotor 20 is fixed on shaft 64 by a key 66 and held in place by nut 68 and washer 70. An internal mounting member 77 is comprised of transverse walls 77a and 77b being bridged by longitudinally extending portions 77c and 77d. Walls 77a and 77b and bridging portions 77c and 77d are formed as one integral unit which is supported on wall 81 by any convenient means such as a series of screws 83, and on wall 81 by a series of screws 83a. Walls 63 and 81 may be formed integrally and wall 81a secured to wall 63 by any convenient means such as screws, not shown. Bearing 72 is retained on shaft 64 by a portion of the hub of rotor 20, and bearing 74 is retained on the shaft by a nut 73. Bearing 74 is mounted in wall 77b and retained therein by retained plate 69 secured to the walls by screws. Internal walls 77a, 81 and 81a form a chamber 71 and support the gear drive to the register 48 and the rotation sensing apparatus, which will be described later. Openings (one of which is shown at 75) are provided with filters 75a, and provide pressure balance between the line fluid and the interior of the chamber 71, while the filters bar contaminants from the chamber.

The gear drive to the register 48 provides a mechanical read-out of the accumulated volume of flow through the meter 10. It consists of a worm gear 76 fixed on rotor shaft 64 and meshing with and driving worm wheel 78. Worm wheel 78 is fixed on an intermediate shaft 80 as by a pin through the hub 79 of worm wheel 78 and the intermediate shaft 80. Shaft 80 is journalled in bearings 82 and 84 mounted respectively on bridging portions 77d and 77c. One end of shaft 80 projects through bridging portion 77c beyond bearing 84 and has pinion 86 mounted thereon. Pinion 86 meshes with gear 88 mounted on shaft 90, which is rotatably mounted in the outer wall of measuring chamber 58 by a bearing 85 and by a bearing (not shown) within the housing of register 48. As shaft 90 rotates, it provides a direct mechanical drive through an assembly 92. (FIG. 1) comprised of a magnetic coupling and associated reduction gears to drive register 48 mounted on top the meter housing. The magnetic coupling and associated reduction gears 92 are well known in the turbine metering art, for example, see U.S. Pat. No. 3,858,488, issued Jan. 7, 1975, and assigned to the assignee of this application.

In addition to the mechanical registration of flow, an electronic pickup assembly 100 is installed in the chamber 71. This assembly comprises a slot sensor 102 (FIG. 8) mounted on an internal wall of chamber 71, and a metal disc 104 having a number of radial slots 106 and mounted on the rotor shaft 64 for rotation therewith. The sensor 102 is mounted to receive a portion of disc 104 between two spaced portions of the sensor, so that, upon rotation of the disc the sensor detects the passage of the slots 106. A number of sensors are commercially available and the type used in this embodiment are sold by R. B. Denison and is their model S J 3, 5N. This type of sensor is supplied with a steady electric signal of say 40 K Hz. Alternate passage of slots and solid portions of the metal disc between the spaced portions produce changes or modulations in the amplitude of the signal supplied to the sensor. These modulations are rectified or otherwise processed within the sensor to produce a pulse each time the air gas is changed by passage of a slot between the spaced portions of the sensor. Conductors 108 (FIG. 2) extend from sensor 102 to a source of power and to a processing circuit exterior of the meter as will be explained later.

Immediately downstream of the metering rotor 20, a thrust balancing plate 110 of proper diameter and axial length has a series of circumferentially spaced openings 112 which when the plate 110 is in position are aligned with blades 62 of rotor 20 and blades 67 of sensing rotor 22 and are of the same radial dimension as annular passage 60 to produce a continuation thereof. The portions of plate 110 radially inward are coextensive with the portions of rotors 20 and 22 which are radially inward of the blades 62 and 67. The peripheral portion of plate 110 abuts a shoulder 120 in the housing of the measuring chamber and is held in position by set screw 116.

Immediately downstream of thrust balancing plate 110 is a sensing rotor assembly 22 having blades 67. The construction is similar to the metering rotor assembly, except that the angle of the blades with respect to the fluid flow is different and no provision for mechanical registration is necessary in connection with this rotor. A mounting member 122 similar to mounting member 77 is comprised of walls 123 and 124 which enclosed between them chamber 138. Rotor shaft 126 is journalled on walls 123 and 124 by means of bearings 134 and 136 and rotor 22 is secured on shaft 126 by means of key nut 132 and washer 130. The sensing rotor is thereby mounted for free rotation immediately downstream from metering rotor 20 and thrust balancing plate 110.

Within chamber 138, a pick up assembly 144 comprised of metal disc 148 similar to disc 104, is mounted for rotation with shaft 126 and sensing rotor 22. A slot sensor 146 similar to sensor 102 has spaced arms embracing the disc as shown. Disc 148 has slots similar to disc 104 but not the same number. Disc 148 and sensor 146 cooperate in the same manner as disc 104 and sensor 102 to produce a pulse in conductor 150 in response to rotation on sensing rotor 22. Openings 140 and filters 142 in walls 122, 123, and 124 provide pressure equalization between chamber 138 and the flow passage of the meter.

Figure 5:
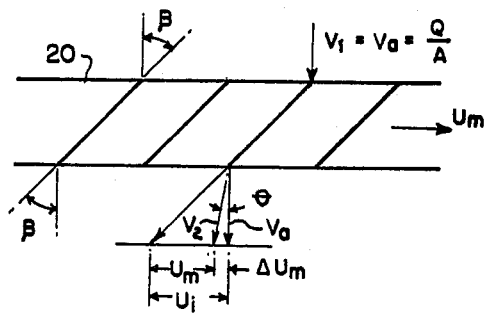
FIGS. 5, 6A, 6B, 7A and 7B are velocity diagrams relating to the exit angle of fluid leaving the metering rotor and the sensing rotor to sense this exit angle and to provide means to correct any change in exit angle, FIGS. 6B and 7B being respectively enlargements of the encircled portions of FIGS. 6A and 7A.

Before entering the blades 62 of the metering rotor 20, the fluid is flowing in a direction of the vector $V_1$ parallel to the axis 23 of rotation of the meter rotor 20, as shown in FIG. 5. As a result of its passage through the blades 62 of the metering rotor 20, to overcome fluid and non-fluid drag, the direction and velocity of fluid flow leaving the rotor as indicated by vector $V_2$ is altered. The fluid flowing through the turbo-meter 10 approaches the rotor 20 as shown in FIG. 5, along a direction indicated by a vector $V_1$ striking the blades 62 of the rotor 20 and exiting therefrom at an angle $\theta$ with respect to a line parallel to the axis about which the rotor 20 rotates. The relationship between the various relevant parameters can be readily understood by reference to velocity diagrams of rotor bladings of high solidity design as shown in FIGS. 5–7B where:

$\beta$ is the angle of inclination of the metering rotor blades with respect to the axis of rotation of the rotor 20;

$\theta$ is the fluid exit angle that is the angle by which the fluid is detected from purely axial flow as a result of its passage through the metering rotor;

Va is the axial component of the absolute velocity $V_1$ of the fluid flowing through the meter and is equal to Q/A;

Q is the rate of flow of the fluid through the meter;

A is the effective area of the flow passage through the meter;

$V_1$ is a vector representing the direction and magnitude of the absolute fluid velocity as the fluid approaches the blade inlet section of the rotor 20 and is assumed to be in a direction parallel to the rotor axis in which case $V_1 = Va$.

$V_2$ is a vector representing the direction and magnitude of the absolute fluid velocity as the fluid leaves the blades 62 of the meter rotor 20 and as shown in FIGS. 5–7B, is offset from the axial direction by the angle $\theta$ i.e., the exit angle of the fluid;

$U_m$ is a vector representing the direction and magnitude of the actual tangential velocity of the metering rotor 20. The vector $U_m$ is parallel to a tangent of the circumference of the rotor 20 and is taken from a point displaced from the axis of the rotor rotation by an effective radius $\bar{r}$, which is calculated in accordance with the following formula:

$$\bar{r} = \left( \frac{r_t^2 + r_r^2}{2} \right)^{\frac{1}{2}}$$

where $r_t$ is the outside radius of the meter rotor 20 and $r_r$ is the radius to the inner roots of the rotor blades 62;

$U_i$ is a vector representing the direction and magnitude of the ideal non-slip tangential velocity of the rotor 20 (at the effective radius $\bar{r}$). This quantity represents the velocity of a rotor not subject to mechanical loading such as bearing friction, the loading of the register mechanism and fluid friction.

$\Delta U_m$ is the difference between the ideal tangential velocity $U_i$ and the actual tangential velocity $U_m$ of the meter rotor 20, due to bearing friction, fluid friction, and other loading.

$\gamma$ is the angle of inclination of the blades 67 of the sensing rotor 22 with respect to the axis of rotation of the rotors 20 and 22;

$U_s$ is a vector representing the direction and magnitude of the tangential velocity of the sensing rotor 22 at its effective radius as defined in a manner similar to that as defined with respect to the metering rotor.

$V_3$ is a vector representing the direction and magnitude of the absolute velocity of the fluid exiting from the blades 67 of the sensing rotor 22.

Throughout this specification, quantities to which an asterisk * is appended represent their respective values at calibration.

As the fluid flowing through the meter 10 is a proper installation approaches the blades 62 of the metering rotor 20, the direction of fluid flow as indicated by vector $V_1$ is parallel to the axis of rotation of the rotors 20 and 22, that is, there is no significant tangential component in the direction of fluid flow. As the fluid impinges on the angular oriented blades 62 of the metering rotor 20, it exerts a driving torque on the blades 62 to cause the rotor 20 to rotate as its synchronous speed corresponding to the given flow rate. Due to the friction of the rotor bearings, fluid friction, the load imposed on the rotor by the mechanical register and other factors, a resulting retarding torque is imposed on the rotor 22 which must be overcome before the rotor 22 can rotate at its synchronous speed. Therefore, the direction of the fluid flow is deflected from its purely axial direction $V_1$ to $V_2$ as it passes through the blades 62 of the existing rotor 20. The amount of fluid flow is defected from its purely axial flow is the angle at which it leaves the metering rotor 20, at its exit section and is referred to as the exit angle $\theta$. As shown the fluid is directed at the sensing rotor 22 in a direction indicated by the vector $V_2$.

Figure 6A:
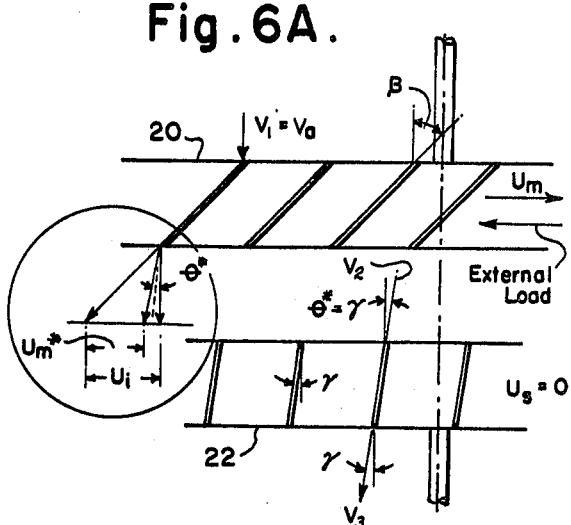
Figure 7A:
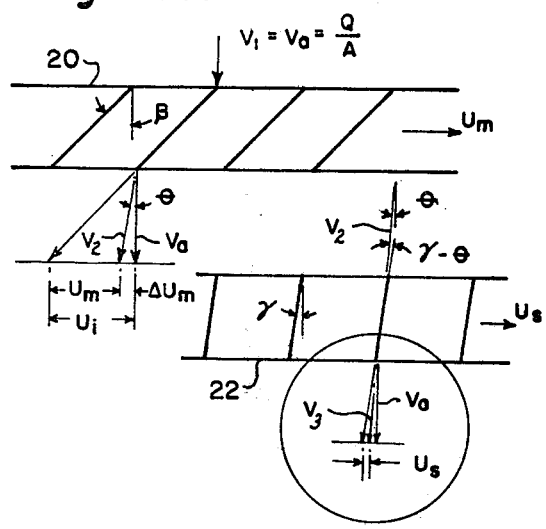
Figure 6B:
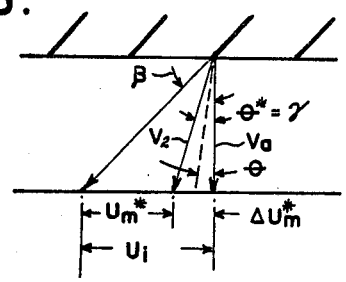
Figure 7B:
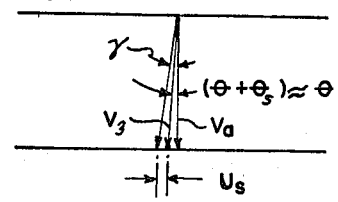

It will be understood from the foregoing and a reference to FIGS. 6A, 6B, 7A and 7B that if the angle $\gamma$, that is, the angle of the sensing rotor blades, is equal to the exit angle $\theta$, the sensing rotor 22 will not rotate in either direction. In this situation, the direction of fluid flow would not impart any rotational force to the sensing rotor 22. If the exit angle $\theta$ is smaller than the sensing rotor angle as illustrated in FIGS. 7A and 7B, the sensing rotor 22 will rotate in the direction indicated by the vector $U_s$. It should be noted at this point that the angle at which the fluid enters the sensing rotor 22 will be slightly less than the exit angle $\theta$ due to the momentum mixing effect when the fluid passes through the space between the two rotors and other factors. However, the difference is generally slight and the angle of the fluid entering the sensing rotor blading will be proportional to the fluid exit angle $\theta$. Therefore, for purposes of the discussion herein, the angle of the fluid entering the sensing rotor blades will be considered to be the same as the exit angle $\theta$ of the fluid leaving the metering rotor.

Figure 4:
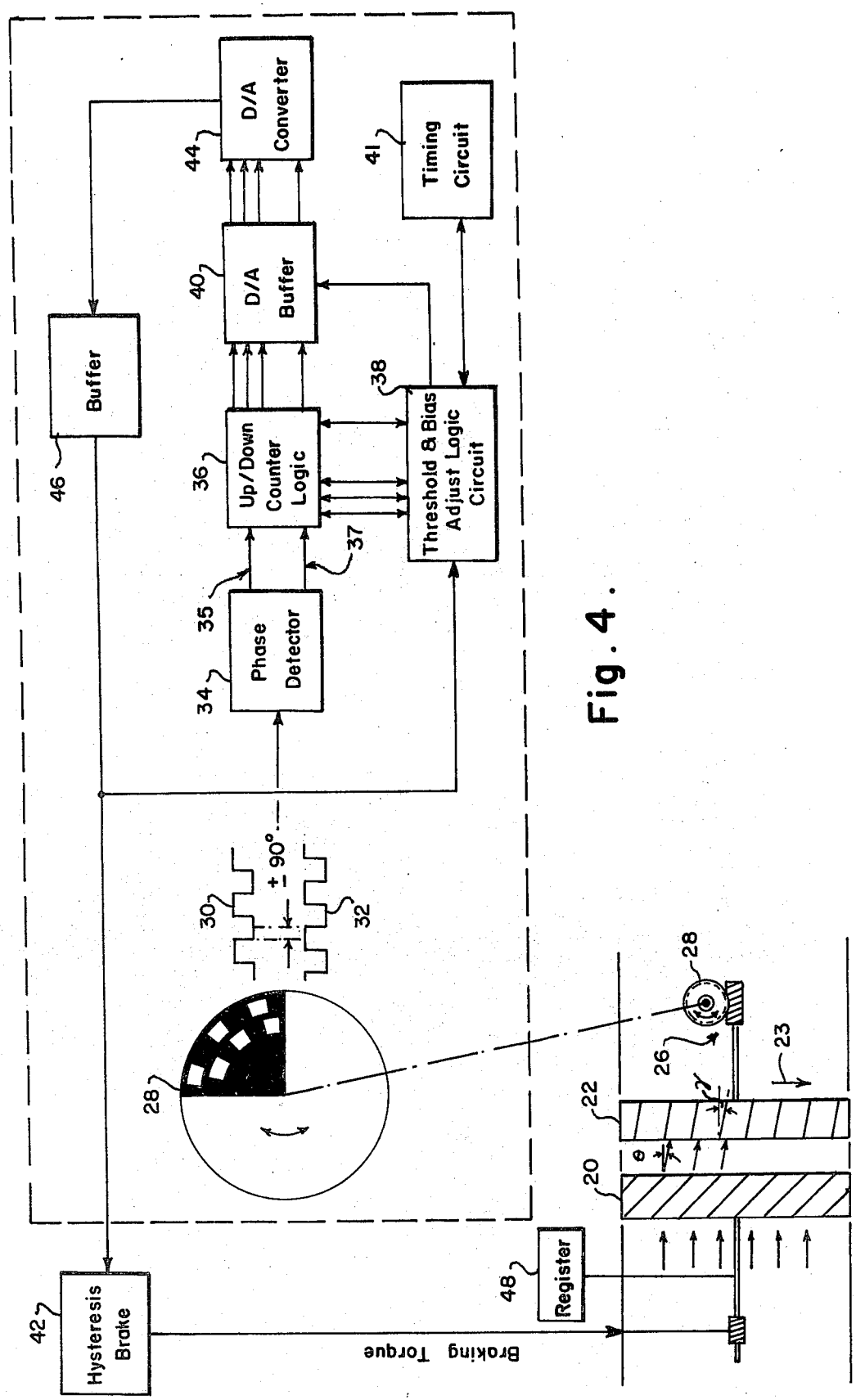
FIG. 4 shows a diagram of another embodiment of a constant accuracy turbine meter.

FIG. 4 shows a system which like that of FIG. 3 applies a variable braking force to the metering rotor 20 in response to variations in the exit angle $\theta$ of the fluid leaving the metering rotor 20 to thereby maintain the accuracy of the readout of the meter register. In the system of FIG. 4, however, the exit angle is sensed by a freely rotatable sensing rotor 22 instead of a pitot tube. The internal design of the meter used in the system of FIG. 4 would be similar to that shown in FIG. 2 which was developed particularly for use in applicants' "self-checking" and "self-correcting" meter systems which will be described in detail later on herein. However, in the FIG. 4 system as shown disc 104 is not utilized and sensing rotor utilizes a different type of an encoder disc 28 which replaces disc 148 of FIG. 2; also photo detectors or pick-ups are shown rather than the slot sensors shown and described in connection with the design of FIG. 2.

The system shown in FIG. 4 will operate to impose a braking force on the metering rotor at all times, and the sensing rotor is designed to rotate at a low rate of speed alternately in opposite directions through a null or stationary condition. FIGS. 6A and 6B show by vector representation the effect of the flow of fluid through the metering and sensing rotors. In this system the calibrated values of the exit angle $\theta$ ($\theta^*$) will be their average values when the meter is operating normally with some braking force applied to the metering rotor which is determined automatically by the system as will be hereinafter described. Since the angle $\theta$ increases with load in the metering rotor, in order that the sensing rotor blade angle $\gamma$ be approximately equal to the angle $\theta$ at calibration ($\theta^*$), the angle $\gamma$ is made slightly larger than the calibrated value of angle $\theta$ would be if no braking force were applied to the rotor.

If the value of $\gamma^*$ were to remain constant, and if the angle $\gamma$ is the same as $\theta^*$ the sensing rotor would be stationary. However, if the speed of the metering rotor 20 decreases from its calibrated value the exit angle $\theta$ will increase and the sensing rotor 22 will be caused to rotate in one direction since $\theta > \gamma$, while an increase in the speed of the metering rotor 20 will cause a decrease in the exit angle which will cause the sensing rotor 22 to rotate in the opposite direction since $\theta < \gamma$. As seen in FIG. 6A, if the exit angle $\theta$ of the fluid flow exiting from the metering rotor 20 increases, the angle $\theta$ will be greater than the angle $\theta^*$ and the fluid flow directed onto the blades 67 of the sensing rotor 22 will strike the right hand faces of the blades 67 as shown in FIG. 6A to cause the sensing rotor 22 to rotate to the left or in a counterclockwise direction viewed from the bottom of FIG. 6A. Conversely, if the rotational velocity of the meter rotor 20 should increase, its exit angle $\theta$ will decrease and will be less than $\gamma$, whereby the fluid flow will strike the left hand faces of the blades 67 of the sensing rotor 22, causing the rotor 22 to move to the right or in a clockwise direction viewed from the bottom of FIG. 6A. Rotation of the sensing rotor 22 is transmitted through shaft and gear connection 26 to an encoder disc 28, as shown in FIG. 4. A light source (not shown) is positioned to direct a light beam through the openings of the encoder disc 28 and onto a pair of photo detectors (not shown). This disc has two concentric series of openings about the axis of the disc, overlapped so that the light beam is periodically interrupted and the pair of photo detectors will produce pulses 30 and 32 for both clockwise and counter-clockwise rotation of the sensing rotor. The concentric openings are radially oriented in a manner to provide output pulses with a $\pm 90$ phase difference with respect to each other. When the disc 28 is rotating in one direction the pulse signal 30 will lead pulse signal 32 by 90° while rotation of the disc is the opposite direction will relsult in pulse signal 30 lagging pulse signal 32 by 90°. Thus the phase relationship between the two pulse signals gives an indication of the direction of rotation of the disc 28. The output from the photo detectors is supplied to a phase detector 34 which senses the phase relationship between pulse signals 30 and 32 and therefore the direction of rotation of disc 28. The phase detector produces two digital output signals 35 and 37 which are applied to up/down binary counter 36. The output on line 35 conditions the counter 36 to count either up or down depending on the phase relationship between signals 30 and 32.

Depending on the phase relationship between signals 30 and 32 as sensed by phase detector 34, the up/down control signal applied via line 35 will be such as to condition the counter 36 to count up or count down the pulse values imposed on line 37 to the counter. As the sensing rotor rotates, line 37 applies the pulses from the photo detectors to counter 36 which are counted up or down depending on the up/down signal received from the phase detector 34 which in turn depends on the direction of rotation of the sensing rotor and disc 28.

A threshold and bias adjust logic circuit 38 contains elements well known in the art including (1) an analog/-digital converter which takes the analog value of the voltage out of buffer 46 as determined by the value of the bias in D/A buffer 40, and converts it to a digital value; (2) logic elements which apply offset values to the bias sensed by the D/A converter; these offset values establish plus and minus threshold values for the bias; (3) a comparator which when instructed to do so by the internal sequencing logic of circuit 38 will compare the pulse count value on counter 36 with the plus and minus threshold values to determine whether or not the pulse count of counter 36 falls within or outside the range established by the threshold values.

A timing circuit 41 causes the logic circuit 38 periodically at fixed intervals to perform the operations hereinafter described. At start up or initialization, by means of 15 manually operated thumbswitches the logic circuit 38 is initially programmed with an initial bias factor. While this initial bias factor is arbitrarily selected, its general value will be known from repeated experience. For illustrative purposes an initial bias factor having a value of 100 will be assumed. As soon as the circuit 38 is programmed with the initial bias factor of 100 this value is transferred to counter 36 and a signal is applied to D/A buffer 40 which causes it to accept the value stored in counter 36. The D/A buffer now contains the initial bias factor. This factor is simultaneously applied to D/A converter 44 which applies an analog signal to buffer 46 corresponding to the initial bias factor. The buffer 46 applies an output to brake 42 which causes an initial braking force corresponding to the initial bias factor of 100 to be applied to the metering rotor. Also, upon initial programming of logic circuit 38 it computes offset values to establish positive and negative threshold values for the bias factor. For example it will be assumed that the logic circuit 38 is programmed to apply an offset value of ±10 so that threshold values of 90 and 110 will be established.

Immediately upon the logic circuit 38 being programmed with the initial bias factor, it will signal the counter 36 to enable it to begin counting pulses from the sensing rotor. At the same time the timing circuit 41 will be enabled to send timing pulses to the circuit 38 defining fixed time intervals. During the first timing interval the counter 36 will increment or decrement depending on which way the sensing rotor is rotating. In this example it will be assumed that the initial bias factor loaded the metering rotor so that the sensing rotor was caused to rotate in a direction in which the counter 36 is incremented. At the end of the first timing interval the timing circuit will apply a signal to the logic circuit 38 which causes it to instantaneously perform the following sequence of operations. A comparison is made between the then existing value of the pulse count in counter 36 with the initially established threshold values of 90 and 110. If the pulse count is outside the range of threshold values, say at 115, the comparator in the logic circuit 38 signals the D/A buffer 40 to accept the then existing pulse count on the counter 36 as the new bias factor. The buffer 40 then sends a new signal to D/A converter 44 which causes it to produce a new analog signal to buffer 46 which in turn produces a new output to the brake causing the braking force to increase. The speed of the metering rotor is, therefore, decreased.

The A/D converter is logic circuit 36 now senses the value of the new output from buffer 46 (corresponding to bias factor 115) and converts it to digital form causing the logic circuit 38 to compute new threshold values of 105 and 125. All of the functions of the logic circuit 38 for the first timing interval have now been performed.

At the end of the second timing interval the pulse count on the counter 36 will again be compared with the threshold values of 105 and 125. If the pulse count value in counter 36 is within this range, nothing happens until the end of some future timing interval when the accumulated pulses on the counter 36 are outside the range. If the new bias factor and resulting increase in braking force was not yet sufficient to reverse the direction of rotation of the sensing rotor, counts will continue to be incremented on counter 36 during subsequent timing intervals until the accumulated pulse count exceeds the upper threshold value. When at the end of a subsequent interval the pulse count on counter 36 exceeds 125, e.g. 126, a new bias factor of 126 with new threshold values of 116 and 136 will be established which through the process described above will result in a slightly increased braking force on the metering rotor sufficient to cause the sensing rotor to reverse direction of rotation causing the phase relationship between the pulses trains 30 and 32 to reverse which causes pulses from the sensing rotor to decrement the pulse count on counter 36 from 126. This pulse count will continue decrementing in succeeding timing intervals until the lower threshold value is exceeded. Thus, when the counter 36 is decremented to something less than 116, e.g. 115, a new bias factor of 115 together with new threshold limits of 105 and 125 are established which causes the braking force on the metering rotor to be decreased, increasing the speed of the metering rotor which causes the sensing rotor to again reverse so that the pulse counts from the sensing rotor will again be incremented on counter 36. The pulses will be incremented until the then existing upper threshold value of 125 is exceeded at which point the bias factor will again be established at the value in excess of 125, e.g. 126. Thus in succeeding time intervals, bias factors of 115 and 126 will be alternately established causing the sensing rotor to reserve direction each time a proper bias factor is estblished. This causes the braking force on the metering rotor to be alternately increased and decreased resulting in corresponding alternate decreases and increases in metering rotor speed and successive reversals in the direction of rotation of the sensing rotor. By this process an average value of the metering rotor speed and exit angle $\theta$ is established which may be considered as their normal or calibrated values.

It will be understood that the drive or signal from the metering rotor to the register will be adjusted at time of calibration to register 100% registration as determined by a prover when the metering rotor and sensing rotor are operating at their normal or calibrated values.

If the average speed of the metering rotor is caused to change, whether due to changes in fluid flow rate, or malfunction of the metering rotor, new bias factors and threshold values will be established which will automatically adjust the braking force on the metering rotor which will cause it to rotate at a speed which will produce 100% registration on register 48.

The use of a sensing rotor 22 to sense the fluid exit angle $\theta$ from the metering rotor 20 provides a device much less likely to malfunction from impurities in the flow stream. It also provides a means of sensing the exit angle $\theta$ of fluid throughout the complete annular flow passage, providing a more accurate average exit angle reading than the single flow direction-detecting pilot-tube could supply.

Both systems of FIG. 3 and 4 utilize a feed-back system and a braking system of variable magnitude by means of which the braking magnitude on the metering rotor 20 is altered in accordance with deviations in the exit angle $\theta$ from the sensing rotor blade angle $\gamma$ to maintain the exit angle $\theta$ to have an average value equal to the sensing rotor blade angle (i.e., $\theta=\theta^*=\gamma$), and thereby maintain the accuracy of meter registration at its calibration value.

It has been discovered that the end results of constant accuracy metering by maintaining a constant fluid exit angle and a nulled sensing rotor by means of a braking system on the metering rotor 20 through a feed-back system can also be achieved in an alternative manner by a novel metering system consisting of simply a standard metering rotor 20 and a free running sensing 22 rotor placed downstream, as shown in FIG. 2 without the need of a braking device or feed-back system. Moreover, this metering system will not only perform "self-correcting" to maintain automatically and continuously a constant meter accuracy at calibration condition, but it can also perform "self-checking" to indicate automatically and continuously that the metering rotor is operating either within or without the selected deviation limit range from its calibration meter registration as well as the magnitude of any such deviation. The basic concept of this novel metering system having this "self-correcting" and "self-checking" capabilities can be shown with reference to FIGS. 7A and 7B.

Noting the definitions of the vectors, angles and other parameters given with respect to FIGS. 7A and 7B, an expression may be developed for the meter registration of the metering rotor 20 that will provide a basis for developing a self-correcting meter system that does not require the use of the hysteresis brake 42 as shown in FIG. 4. First, the meter registration of the metering rotor 20 is defined as the ratio of the actual tangential velocity $U_m$ to the ideal tangential velocity $U_i$ of the meter rotor 20, in accordance with the following expression:

$$\text{Meter Registration} = U_m/U_i \quad (1)$$

As seen from the velocity diagram of the exit velocity $V_2$ of the fluid flowing from the metering rotor 20 in FIG. 7, the actual tangential velocity $U_m$ of the metering rotor 20 is the difference between the ideal tangential velocity $U_i$ and the meter rotor slip $\Delta U_m$ due to the drag or load placed upon the metering rotor.

Thus, equation 1 may be expressed as follows by simple substitution and rearrangement:

$$\frac{U_m}{U_i} = \frac{(U_i - \Delta U_m)}{U_i} = 1 - \frac{\Delta U_m}{U_i} \quad (2)$$

Further, it is noted that if no loading is placed upon the meter rotor 20, that the exit flow of fluid from the metering rotor 20 will be of substantially the same magnitude as $V_1$ entering the meter rotor 20 and in a direction substantially parallel to the rotor axis, as indicated in FIG. 7A. The amount of drag or loading $\Delta U_m$ may be calculated using this vector diagram as follows:

$$\frac{\Delta U_m}{V_a} = \tan \theta \quad (3)$$

Solving this equation for $\Delta U_m$ provides the following equation:

$$\Delta U_m = V_a \tan \theta \quad (4)$$

Similarly, from FIG. 7A, the ideal tangential velocity $U_i$ may be expressed by the following expression:

$$\frac{U_i}{V_a} = \tan \beta \quad (5)$$

Rearranging equation 5, the ideal velocity $U_i$ may be expressed as follows:

$$U_i = V_a \tan \beta \quad (6)$$

Substituting expressions 4 and 6 in expression (2)

$$\frac{U_m}{U_i} = 1 - \frac{V_a \tan \theta}{V_a \tan \beta} = 1 - \frac{\tan \theta}{\tan \beta} \quad (7)$$

It is seen from equation 7 that the change of actual rotor speed $U_m$ of the rotor 20 or meter registration ($U_m/U_i$) will result in a change of exit angle $\theta$. If rotor speed $U_m$ of the metering rotor decreases, the exit angle $\theta$ will increase and vice versa. It will therefore be evident that in a conventional meter the meter registration (accuracy) will be dependent on and vary with, exit angle $\theta$.

As will be hereinafter more fully examined in a practical embodiment of the invention herein described, it is desirable that the sensing rotor be adapted to rotate in the same direction as the metering rotor but at a greatly reduced speed. As was explained in connection with the system of FIG. 4 when the sensing rotor blade angle $\gamma$ is the same as the exit angle $\theta$ the sensing rotor will be motionless. Thus by making the blade angle $\gamma$ slightly larger than exit angle $\theta$, the sensing rotor will be caused to rotate in the same direction as the metering rotor but at a greatly reduced speed.

The meter registration of the sensing rotor 22 in terms of the ideal rotor speed $U_i$ of the metering rotor 20 for small blade angle $\gamma$ of the blades 67 of the sensing rotor 22 and small angles of attack ($\gamma - \theta$) of the fluid exiting from the meter rotor 20 and directed onto the blades 67 of the sensing rotor, will now be developed.

From FIGS. 7A and 7B it can be seen that the sensing rotor speed $U_s$ $$U_s = V_a \tan \gamma - V_a \tan \theta \quad (8)$$

Therefore the registration of the sensing rotor in terms of the ideal velocity $U_i$ of the metering rotor is $$\frac{U_s}{U_i} = \frac{V_a \tan\gamma - V_a \tan\theta}{U_i} \quad (9)$$

Substituting expression (6) into expression (9) becomes $$\frac{U_s}{U_i} = \frac{V_a \tan\gamma - V_a \tan\theta}{V_a \tan\beta} = \frac{\tan\gamma}{\tan\beta} - \frac{\tan\theta}{\tan\beta} \quad (10)$$

From expression (10) it is seen that any change in exit angle $\theta$ of the metering rotor 20 will change the speed of the sensing rotor 22. An increase of exit angle $\theta$ will decrease the sensing rotor speed $U_s$. In other words, as the exit angle $\theta$ becomes greater, the angle of attack of the fluid as it flows from the meter rotor 20 (as seen in FIG. 7A) onto the blades 67 of the sensing rotor 22 becomes smaller, whereby the total force applied to the blade 67 becomes smaller. In case the exit angle $\theta$ becomes greater than the sensing rotor blade angle $\gamma$ i.e., $\theta > \gamma$, then $\tan\theta > \tan\gamma$. Equation (10) shows the sensing rotor speed $U_s$ becomes negative if the angle $\theta$ were to increase above angle $\gamma$. Physically, this means the sensing rotor 22 would rotate in the opposite direction to the direction as indicated by the vector $U_s$ as shown in FIG. 7A i.e., the sensing rotor 22 is now rotating in the opposite direction of the metering rotor 20. Therefore, the above equation is valid for any amount of speed change of metering rotor 20 resulting in any amount of change in exit angle $\theta$ ($\theta$ could be greater or smaller than $\gamma$), and either direction of rotation of the sensing rotor 22. However as will be hereinafter explained, in practice, before this value of $\theta$ is reached to cause the sensing rotor to reverse direction of rotation, a signal will indicate that the meter is operating beyond the permissible limits of deviation from calibration so that the meter may be taken out of service.

From the above equations 7 and 10, it is seen that if the metering rotor registration ($U_m/U_i$) changes, the exit angle $\theta$ will change, and the sensing rotor registration ($U_s/U_i$) will also change. However, if we consider the difference $U_c$ between the metering rotor speed or registration and the sensing rotor speed or registration (sensing rotor speed is taken as positive when it rotates in the same direction as the metering rotor 20, as shown in FIG. 7A, but negative when it rotates in the opposite direction of the metering rotor), the following is derived from equations (7) and (10):

$$\frac{U_c}{U_i} = \left(\frac{U_m}{U_i} - \frac{U_s}{U_i}\right) = \left(1 - \frac{\tan\theta}{\tan\beta}\right) - \left(\frac{\tan\gamma}{\tan\beta} - \frac{\tan\theta}{\tan\beta}\right) = 1 - \frac{\tan\gamma}{\tan\beta} \quad (11)$$

Equation 11 indicates that for a first order of approximation, the difference in the rotor speed (or registration) $U_c/U_i$ between the metering rotor and sensing rotor, depends only on the metering rotor blade angle $\beta$ and the sensing rotor blade angle $\gamma$, and therefore is a constant for a given meter employing the invention thereof. It does not depend upon the varying load placed upon the meter rotor 20 or its exit angle $\theta$. The physical reason for this is that when the metering rotor speed $U_m$ changes for a given flow rate as a result of change in, for example, bearing friction and fluid drag, the exit angle $\theta$ will have a corresponding change according to expression 7. This change in $\theta$ will bring forth a corresponding change in sensing rotor speed $U_s$ according to expression 10. It can be seen from expressions (10) and (11) that any amount of change in metering rotor speed $U_m$ produces a like amount of change in sensing rotor speed $U_s$ thus resulting in no net change in $U_c$ if the difference $U_c$ between the metering rotor speed and the sensing rotor speed is measured as the basis of providing an improved self-correcting meter system. In other words, the algebraic difference between the speed $U_m$ of the metering rotor and the speed $U_s$ of the sensing rotor will remain practically constant for all values of metering rotor speed at a given flow rate, as long as the sensing rotor 22 is in its normal operating condition. This relationship which is derived from expression (11) which provides the self-correcting feature of the instant invention can be expressed in terms of % of registration as $$N_c = N_m - N_s = \text{constant} \quad (12)$$

With the blades of the metering rotor 20 formed with an angle of 45° with the direction of the fluid flowing into the meter 10, as is conventional, the exit angle $\theta^*$, at calibration will be in order of two degrees. The blades 67 of the sensing rotor 22 may be formed at an angle $\gamma$, which will cause it to normally rotate in the same direction as the metering rotor but at a much lower speed. In practical embodiment of the instant invention the speed of the metering rotor 20 will be such that the metering rotor 20 will produce an output which is approximately 106% of the true flow through the meter as would be measured by a prover in series in the test loop with the meter, the flow measured by the prover being considered to be 100% registration. The blades 67 of the sensing rotor 22 will be formed with an angle such that the sensing rotor 22 will rotate in the same direction as the metering rotor 20 and its speed is such that its output represents approximately 6% of the true flow. The outputs from the metering rotor and sensing rotor may be considered to be "offset" from the true or calibrated value of the flow through the meter. The relationship between the self-corrected % registration $N_c$ and the % registration of the metering rotor $N_m$ and sensing rotor $N_s$ is given by equation (12)

$$N_c = N_m - N_s = 106\% - 6\% = 100\%$$

Figure 12:
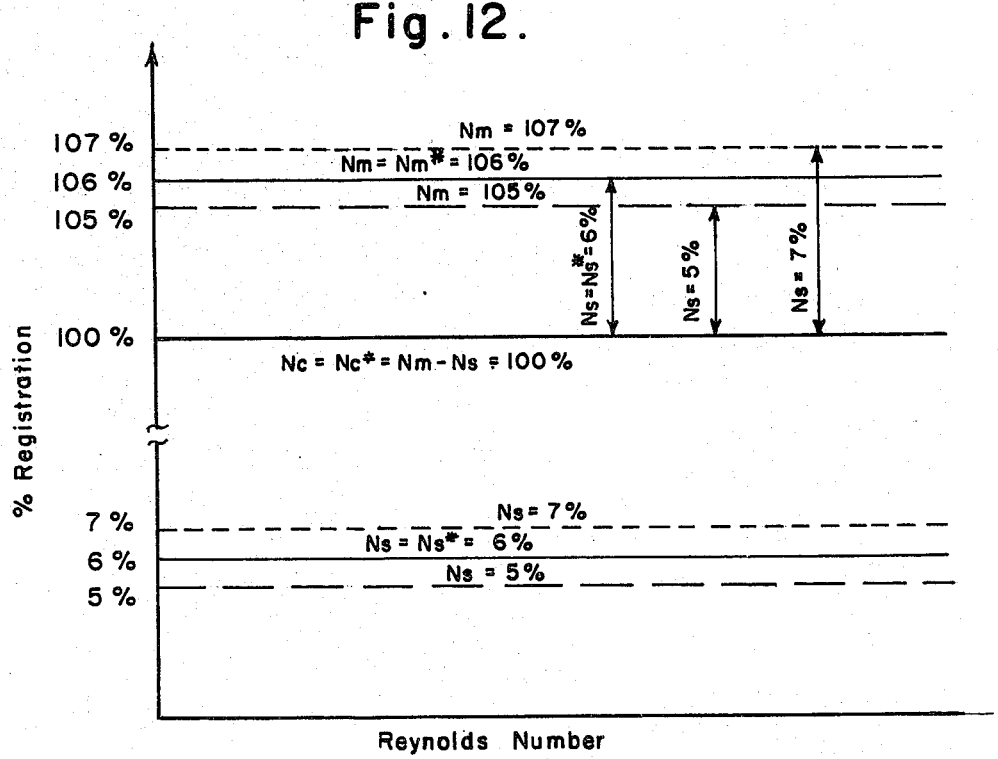
FIG. 12 shows the relationship of the metering rotor speed to the sensing rotor speed for stated conditions throughout the rated range of Reynolds number for this meter.

This relationship is also shown graphically by the solid lines of FIG. 12 for all values of Reynolds number within the rated range of the meter. In the metering art, the performance of a meter is customarily shown by plotting the percentage of registration shown by the meter versus Reynolds number. Reynolds number is a parameter which is well known in the art and represents a combination of the effects of the velocity of fluid flow through the meter, the kinematic viscosity of the fluid, and the characteristic dimension of the meter being tested.

The validity of the relationship expressed in equation (12) may be further demonstrated if it is assumed that the speed of the metering rotor 20 is caused to decrease from its calibrated value (106%) to 105% registration. Such a decrease could be caused, for example, by bearing wear or foreign particles being lodged in the bearing of meter rotor 20. When this happens in a conventional meter the readout from the meter would be less than its calibrated value and therefore less than the actual through-put through the meter. In the instant invention, however, the decrease of 1% registration of the metering rotor 20 will result in an increase in rotor slip $\Delta$Um and therefore an increase in exit angle $\theta$ of the metering rotor (tan $\theta$/tan $\beta$ increased by 1%=0.01 or $\theta$ increased by 0.57° approximately) as seen in equation 7.

This increase in exit angle $\theta$ will reduce the angle of attack ($\gamma - \theta$) of the sensing rotor by 0.57°, resulting in decrease in % registration by the same amount (i.e. 1%) with the sensing rotor running at (6%−1%)=5% registration as observed from equation 10. The corrected % registration Nc remains unchanged according to equations 11 and 12 since $$N_c = N_m - N_s = 105\% - 5\% \times 100\%$$

This relationship between the % registration of the two rotors 20 and 22 and to the corrected % registration remaining at 100% registration even when the metering rotor is slowed down from 106% to 105% is shown graphically by the broken lines in FIG. 12.

Similarly, if the speed of the metering rotor increases from its calibrated value for example to 107% at the same actual flow rate, the exit angle $\theta$ will be decreased by 0.57° (or tan $\theta$/tan $\beta$ will be decreased by 0.01). This decrease in exit angle $\theta$ will increase the angle of attack ($\gamma - \theta$) of the fluid onto the blades 67 of the sensing rotor 22, resulting in an increase of % registration of the sensing rotor 22 by the same amount, i.e. 1% from 6% to 7%. The corrected % registration Nc will still remain the same, i.e. 100% since $$N_c = N_m - N_s = 107\% - 7\% = 100\%$$

Such a relationship is shown by the dotted lines in FIG. 12. Thus it is seen that a readout in terms of the algebraic difference between the speed of the metering rotor 20 and the speed of the sensing rotor 22 at a given flow rate will provide a readout of 100% accuracy at all metering rotor speeds even if the metering rotor speed departs from its calibrated value, provided the sensing rotor 22 is functioning properly. It is this characteristic of the instant invention which is termed "self-correcting".

It will be appreciated that the designed speed of the sensing rotor 22 could be any value relative to the designed speed of the metering rotor 20 and the above expression for self-correction would still be true. As a practical consideration, however, it is desirable to design the sensing rotor 22 to rotate at a much slower speed in comparison to that of the metering rotor 20 to minimize the number of rotations and both the radial and the thrust loading and thus wear on the sensing rotor bearings and thereby minimize the liklihood of sensing rotor malfunction. Also, as will be hereinafter demonstrated, it is desirable that the speed of the sensing rotor be much less than that of the metering rotor in order to realize the full benefits of the instant invention. In the embodiment described above the blades 67 of the sensing rotor 22 would be formed at approximately an angle of 3° to 4° (i.e. $\gamma = 3°$ to 4°) to provide a 6% registration at calibration whereas the blade angle $\beta$ of the metering rotor 20 is about 45° to provide 106% registration at calibration.

Also, the above expression is also valid for the case where the sensing rotor 22 is designed to rotate in the opposite direction from that of the metering rotor 20. In a meter in which the sensing rotor 22 is designed to rotate in the opposite direction from that of the metering rotor 20 at calibrated speeds, the angle $\gamma$ of the sensing rotor blades 67 with respect to the direction of the flow of fluid into the meter will be less than the exit angle $\theta$ and may even be negative with respect thereto; that is, diverging from the axis of rotation in a direction opposite from that of the exit angle $\theta$. Therefore, a decrease in the speed of the metering rotor 20 from its calibrated value which causes an increase in the exit angle $\theta$ will cause an increase in the speed of the sensing rotor 22 and conversely an increase in the speed of the metering rotor 22 over its calibrated value will cause a decrease in the speed of the sensing rotor. Thus, if the speed of the metering rotor 20 is representative of 94% registration at calibration and the speed of the sensing rotor is 6% in the opposite direction of rotation of the metering rotor $$N_c = N_m - N_s = 94\% - (-6\%) = 100\%$$

registration and a 1% decrease in metering rotor speed will cause a 1% increase in sensing rotor speed in the opposite direction so that $$N_c = 93\% - (-7\%) = 100\%$$

Thus, the instant invention will provide a self-correcting capability when the rotors rotate in opposite direction as well as when they are designed to rotate in the same direction. However, when the two rotors rotate in opposite directions the self-checking characteristic described below is not as reliable as that with two rotors rotating in the same direction as will be demonstrated hereinafter.

As indicated above, the self-correcting characteristic of the instant invention will provide 100% registration at all speeds of the metering rotor 20 at a given flow rate so long as the sensing rotor 22 is functioning properly. It would therefore be entirely possible for the metering rotor 20 to operate at speeds as low as 50% of its calibrated value and the corrected reading Nc would still provide accurate registration. Thus the self-correcting feature provides no indication of when either the metering rotor 20 or the sensing rotor 22 is malfunctioning. In practice, in order to prevent excessive damage to the meter it is desirable that the meter be taken out of service and repaired when the speed of the metering rotor deviates from the calibrated value beyond certain prescribed limits.

The invention herein described and the importance of sensing the exit angle may be more fully understood from the following. Referring again to FIG. 5 the accuracy of a meter with no sensing rotor is equal to the ratio of the actual velocity of the metering rotor Um to the ideal velocity of the metering rotor Ui which is the velocity it would attain if there were no resisting torque on the rotor. The meter accuracy (or registration) is expressed mathematically in expressions (1), (2) and (7) above which for convenience are restated below.

$$\frac{Um}{Ui} = \frac{Ui - \Delta Um}{Ui} = 1 - \frac{\Delta Um}{Ui} = 1 - \frac{\tan \theta}{\tan \beta}$$

From this expression it is evident that the meter accuracy is dependent on the value of exit angle $\theta$. It is well known in the art that $$\tan \theta = \frac{(Tn + Tf)m}{(\bar{r}/A) \rho Q^2} \quad (13)$$

Where
Tn is the non fluid resisting torque acting on the metering rotor.
Tf is the resisting torque acting on the metering rotor due to the fluid.
(Tn+Tf)m is the total resisting torque acting on the metering rotor.
$\bar{r}$ is the effective radius of the rotor.
A is the effective flow area.
$\rho$ is the fluid density.
and Q is the rate of fluid flow through the meter.

For small values of $\theta$ (normally approximately 3°) tan $\theta$ is approximately equal to $\theta$. Therefore, $$\theta \approx \frac{(Tn + Tf)m}{(\bar{r}/A) \rho Q^2} \quad (14)$$

Figure 10:
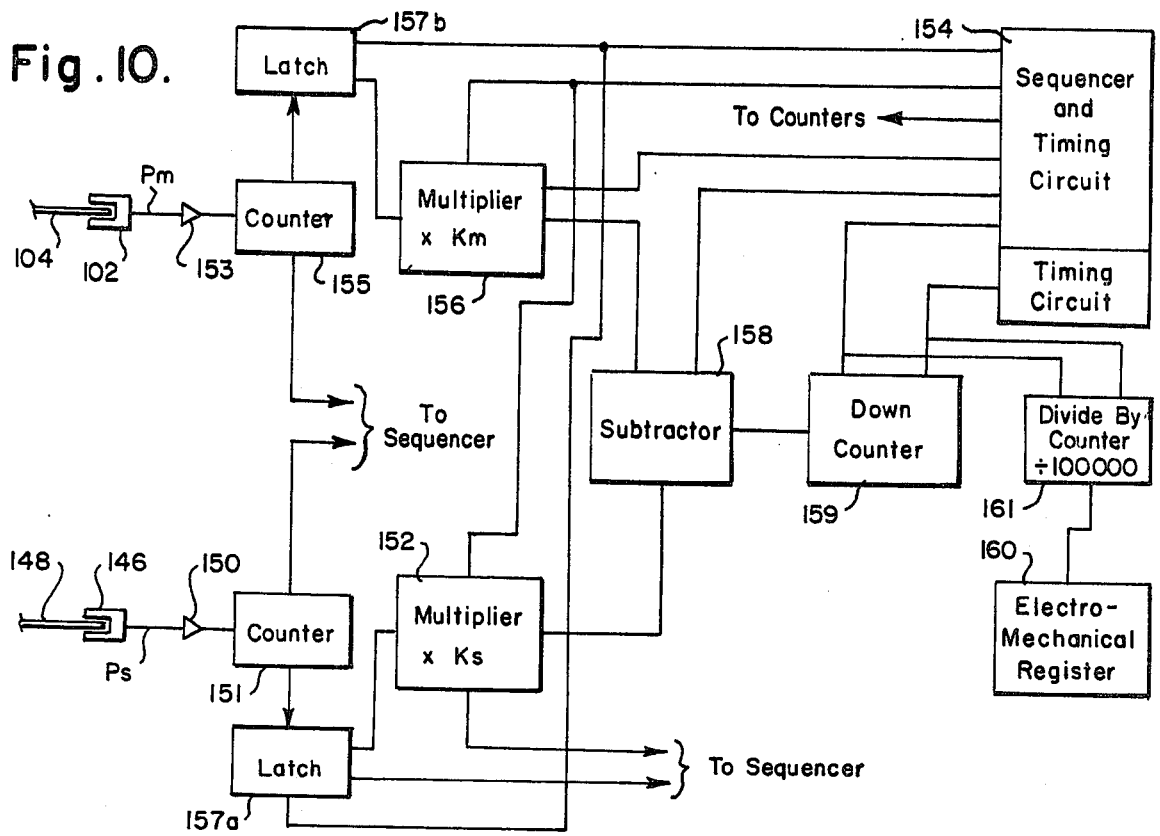
FIG. 10 shows the self-correcting circuit inside the panel of FIG. 9.
Figure 11:
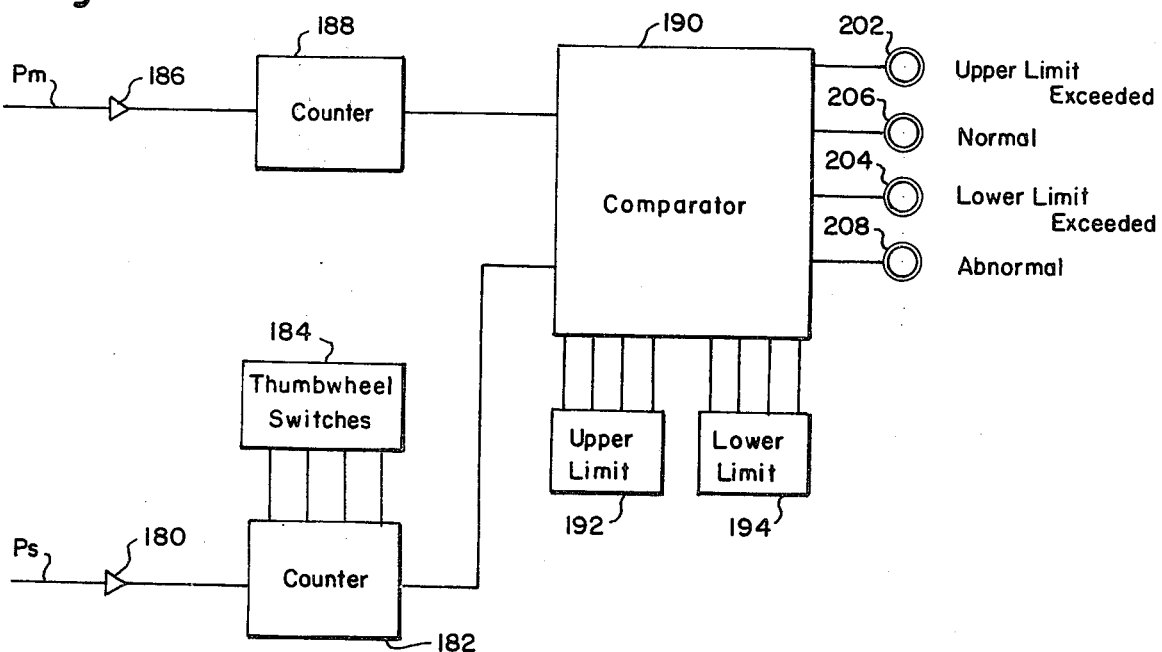
FIG. 11 shows the self-checking circuit inside the panel of FIG. 9.

Since the factor $$\frac{(Tn + Tf)m}{(\bar{r}/A) \rho Q^2}$$

is generally a small but variable quantity, the fluid exit angle $\theta$ in the conventional meter is therefore not constant so that the meter accuracy expression $$1 - \frac{\tan \theta}{\tan \beta}$$

is not constant. Since the only factors affecting meter accuracy are the angle $\theta$ and blade angle $\beta$, the blade angle being fixed, in a turbine meter in which the angle $\theta$ is held constant or one which operates independently of the angle $\theta$, the meter accuracy will be constant. As described above, the meters depicted in FIGS. 3 and 4 achieve constant accuracy by maintaining the exit angle $\theta$ constant, while the meters shown in FIGS. 10 and 11 are independent of the exit angle $\theta$. The manner in which this is achieved by the instant invention may be more fully understood by the following analysis.

Referring to FIG. 7A, since the thrust of the fluid on the sensing rotor is less than on the metering rotor (the angle being less than the angle $\beta$), the bearing load on the sensing rotor is less than the bearing load on the metering rotor and therefore the non fluid torque on the sensing rotor $(Tn)_s$ is less than the non fluid torque on the metering rotor $(Tn)_m$, i.e.

$$(Tn)_s < (Tn)_m \quad (15)$$

The resisting torques due to fluid drag acting respectively on the metering rotor $(Tf)_m$ and on the sensing rotor $(Tf)_s$ act in a tangential direction and are respectively proportionate to the sine of metering rotor blade angle $\beta$ and the sine sensing rotor blade angle $\gamma$. Thus $$(Tf)_m \alpha \sin \beta \text{ and } (Tf)_s \alpha \sin \gamma$$

However, because the relative velocity of the fluid exiting from the sensing rotor is less than the relative velocity of the fluid exiting from the metering rotor the ratio of their torques due to fluid $(Tf)_s/(Tf)_m$ would be less than the ratio of sin $\gamma$/sin $\beta$. Thus $$\frac{(Tf)_s}{(Tf)_m} < \frac{\sin \gamma}{\sin \beta} \quad (16)$$

$$\frac{\sin \gamma}{\sin \beta} = \frac{\sin 3°}{\sin 45°} = \frac{1}{14.2}$$

Therefore the ratios of the respective resulting torques due to fluid drag is very much less than 1, $$\frac{(Tf)_s}{(Tf)_m} << 1 \quad (17)$$

Since the non fluid torque acting on the sensing rotor is less than that acting on the metering rotor, and since the ratio of the fluid drag torque acting on the sensing rotor to that acting on the metering rotor is very much less than 1, it will be apparent that the total resisting torque acting on sensing rotor $(Tn+Tf)_s$ is very much less than the total resisting torque acting on the metering rotor.

$$(Tn+Tf)_s << (Tn+Tf)_m \quad (18)$$

From expression (14)

$$\theta \approx \frac{(Tn + Tf)m}{(\bar{r}/A)\rho Q^2} \quad (14)$$

and $$\theta_s \approx \frac{(Tf + Tf)s}{(\bar{r}/A)\rho Q^2} \quad (19)$$

From expressions (14), (18) and (19)

$$\theta_s \approx \frac{(Tn + Ts)s}{(\bar{r}/A)\rho Q^2} << \theta \approx \frac{(Tn + Tf)m}{(\bar{r}/A)\rho Q^2} \quad (20)$$

It will therefore be seen that $\theta_s$ is very much smaller than $\theta$.

The expression for meter accuracy (registration) for a meter employing the instant invention in which both rotors rotate in the same direction is $$\text{Meter Accuracy} = \frac{(Um - Us)}{(Ui)} \quad (21)$$

which may be written $$\frac{(Um)}{(Ui)} - \frac{(Us)}{(Ui)} \quad (22)$$

From expression (7), $$\frac{(Um)}{(Ui)} = 1 - \frac{\tan \theta}{\tan \beta}$$

and from FIG. 7B $Us = Va \tan \gamma - Va \tan (\theta + \theta_s)$.
Therefore expression (22) may be written $$\frac{Um}{Ui} - \frac{Us}{Ui} = \quad (23)$$

$$\left(1 - \frac{\tan \theta}{\tan \beta}\right) - \left(\frac{Va \tan \gamma - Va \tan (\theta + \theta_s)}{Ui}\right)$$

From FIG. 7A $Ui = Va \tan \beta$ and substituting in (23) the expression for accuracy for a meter in which both rotors rotate in the same direction is $$\text{Meter Accuracy} = \left(1 - \frac{\tan\theta}{\tan\beta}\right) - \left(\frac{\tan\gamma}{\tan\beta} - \frac{\tan(\theta+\theta_s)}{\tan\beta}\right) \quad (24)$$

As demonstrated above, $\theta_s$ is much smaller than $\theta$ and for all practical purposes may be disregarded so that $$\text{Meter Accuracy} = \left(1 - \frac{\tan\theta}{\tan\beta}\right) - \left(\frac{\tan\gamma}{\tan\beta} - \frac{\tan\theta}{\tan\beta}\right) \quad (25)$$

or $$\text{Meter Accuracy} = 1 - \frac{\tan\gamma}{\tan\beta} = \text{constant} \quad (26)$$

Thus in a turbine meter employing the self-correcting feature of the invention herein the variable fluid exit angle $\theta$ is replaced with a constant rotor blade angle $\gamma$.

Through an analysis similar to that employed in the development of expression (24) it can be shown that the expression for the accuracy of a meter in which the two rotors rotate in opposite directions is $$\text{Meter Accuracy} = \frac{U_m - (-U_s)}{U_i} \quad (27)$$

$$= 1 + \frac{\tan\gamma}{\tan\beta} - \frac{\tan\theta_s}{\tan\beta} \quad (28)$$

If in such a meter the sensing rotor is adapted to rotate at approximately the same speed as the metering rotor, such as for example, as disclosed in Griffo U.S. Pat. No. 3,934,473, the blade angle $\gamma$ of the sensing rotor will be essentially the same as the blade angle $\beta$ of the metering rotor (the factor $\tan\gamma/\tan\beta \approx 1$) and expression (28) becomes:

$$\text{Meter Accuracy} = 1 + 1 - \frac{\tan\theta_s}{\tan\beta} \quad (29)$$

or $$= 2\left(1 - \tfrac{1}{2}\frac{\tan\theta_s}{\tan\beta}\right) \quad (30)$$

It will be noted that the meter accuracy will vary with one half the value of the sensing rotor deflection angle $\theta_s$. Since in such a meter both rotors rotate at approximately the same speed, the respective deflection angles will be approximately equal ($\theta_s \approx \theta$) and the amount of variation in registration would be one half as great as would be produced in a conventional meter.

Again this is true only so long as the sensing rotor is not malfunctioning and it should be pointed out that since the sensing rotor is rotating at approximately the same speed as the metering rotor the possibility of the sensing rotor malfunctioning is of the same order of magnitude as that for the metering rotor.

For a meter in which the two rotors rotate in opposite directions but the speed of the sensing rotor is, for example, one order of magnitude less than that of the metering rotor, $\theta_s$ is small compared to $\theta$ or and can be disregarded. Expression (28) then becomes $$\text{Meter Accuracy} = 1 + (\tan\gamma/\tan\beta) \quad (31)$$

Since the accuracy of such a meter is independent of any variable factors, essentially complete correction and 100% registration will be achieved. However, as previously hereinabove noted, a meter in which the rotors rotate in opposite directions will not provide a reliable indication of malfunction.

In the foregoing analyses, $\theta_s$ was regarded when the sensing rotor speed is much less (e.g., one order of magnitude) than the speed of the metering rotor. It should be understood, however, that because of the factor $\theta_s$ in expressions (23) and (28), the sensing rotor does in reality introduce a very small error into the meter accuracy or registration. However, when the sensing rotor speed (and $\theta_s$) is of one order of magnitude less than the metering rotor speed (and $\theta$) the deviation from 100% accuracy caused by the sensing rotor is so small as to be within the accepted limits of measurable repeatability of the meter ($\pm 0.1\%$) and is therefore of no practical consequence.

It has been found that the ratio of the speed of the metering rotor 20 to speed of the sensing rotor 22 provides a means to indicate if either the metering rotor 20 or the sensing rotor 22, or both, are malfunctioning. It will be understood, however, that in a meter in which the speed of the sensing rotor is significantly less than that of the metering rotor, as between the two rotors, any malfunction will probably be due to metering rotor 20 because of the relatively higher radial and thrust loads as well as the higher speed at which it rotates as compared to the sensing rotor 22.

In the embodiment described above where the initial, calibrated values of the metering rotor speed and sensing rotor speed are $$Nm^* = 106\% \text{ and } Ns^* = 6\%$$

at 100% corrected registration the ratio of the metering rotor speed to the sensing rotor speed is $$Nm/Ns = Nm^*/Ns^* = 106/6 = 17.67$$

If it is desired to operate the metering rotor within $\pm 1\%$ of registration at its calibrated value.

$$\text{at } -1\%, \; Nm/Ns = \frac{106-1}{6-1} = \frac{105}{5} = 21$$

$$\text{and at } +1\%, \; Nm/Ns = \frac{106+1}{6+1} = \frac{107}{7} = 15.29$$

Therefore, as long as the ratio of the speed of the metering rotor 20 to the speed of the sensing rotor 22 is within the limits of 15.29 to 21, the speed of the metering rotor 20 will be within $\pm 1\%$ of its calibrated value. If, however, the speed of the metering rotor 20 should drop below the prescribed limits say 2% below its calibrated value, $$\text{at } -2\%, \; Nm/Ns = \frac{106-2}{6-2} = \frac{104}{4} = 26 > 21$$

Similarly, if the speed of the metering rotor should increase 2% above its calibrated value, $$\text{at } +2\%, \; Nm/Ns = \frac{106+2}{6+2} = \frac{108}{8} = 13.5 < 15.29$$

Thus, by continuously monitoring the value of $Nm/Ns$, means is provided to sense a deviation of the speed of the metering rotor 20 from its calibrated value beyond the prescribed limits, so long as the sensing rotor is functioning properly.

If on the other hand, in the unlikely case where the sensing rotor begins to malfunction while the metering rotor is functioning properly, the ratio Nm/Ns will similarly fall beyond the prescribed limits of 15.29 and 21. To illustrate, assume in the embodiment described above, that the speed of the sensing rotor 22 is 1% slower than it should be while the metering rotor 20 continues to operate at its calibrated value then $$Nm/Ns = \frac{106}{6-1} = \frac{106}{5} = 21.20 \text{ which is } > 21$$

If the speed of the sensing rotor 22 is 1% faster than it should be while the metering rotor 20 is operating at calibrated value then $$Nm/Ns = \frac{106}{6+1} = \frac{106}{7} = 15.14 \text{ which is } < 15.29$$

Thus, when the metering rotor 20 is operating within ±1% of its calibrated value, the ratio Nm/Ns will be within its prescribed limits and the corrected registration Nc will be within its prescribed limits and the corrected registration Nc will be at 100% accuracy if the sensing rotor 22 is operating properly. However, a deviation of ±1% in the speed of the sensing rotor 22 from its normal value will cause the Nm/Ns to fall outside the prescribed limits even if the metering rotor 20 is operating at its calibrated value. A system will hereinafter be described which monitors the speed of both the metering rotor 20 and the sensing rotor 22, and provides an output indicative of the difference between the speed of the metering rotor 20 and the sensing rotor 22, the system also being adapted to provide an indication whenever the ratio Nm/Ns falls outside of the limits for which the meter and system is set to operate. An observer is therefore alerted to the fact that either one or both rotors have deviated from their calibrated speeds.

In the embodiments described above, it was assumed that the metering rotor 20 had deviated from its calibrated value while the sensing rotor 22 is operating in its normal condition. Although the possibility is remote, when the sensing rotor 22 rotates at a much lower speed than the metering rotor 20, it is still possible for the sensing rotor 22 to slow down from its normal value due to its own increased bearing friction. In such cases the "limit exceeded" indicator may be actuated even though the metering rotor 20 is operating within the prescribed limits of deviation.

To illustrate, in the embodiment described above, where the calibrated values of the speed of the metering rotor 20 and sensing rotor 22 are Nm=106% and Ns=6%, assume that the metering rotor is running 0.5% slow and the sensing rotor is also running 0.5% slow from its normal value.

Since a decrease in speed in the metering rotor causes an increase in exit angle which results in a corresponding drop in the speed of the sensing rotor (0.5%) and since the sensing rotor is running 0.5% slower than it should, we have Nm=106−0.5=105.50 and
Ns=(6−0.50)=0.50=5.00 and $$Nm/Ns = \frac{105.50}{5.00} = 21.10 > 21.0$$

In such a case, the limit exceeded indicator will be actuated even though the speed of the metering rotor was within the prescribed limits of ±1%.

Consider the case where both rotors are designed to rotate in the same direction in normal operation and consider the most likely abnormal condition where both the metering rotor 20 and the sensing rotor 22 are malfunctioning and therefore rotating slower than normal due to increased bearing friction on each rotor by the amounts of (ΔNm) and (ΔNs) respectively. Then the corrected meter registration Nc is no longer of 100% accuracy but will have an error (ΔNc) equal to the amount of slow down ΔNs of the sensing rotor 22, namely $$\Delta Nc = \Delta Ns \tag{32}$$

If the limits of deviation from calibration conditions of this "self-checking" and "self-correcting" meter designated Δα be set at ±1%, it can be shown the limits Δα=±1% have been exceeded and the "limit exceeded" indication will be produced once the sum of the metering rotor deviation (ΔNm) and the sensing rotor error (ΔNs) reaches the set limit of 1%, in accordance with the following:

$$-[(\Delta Nm)+(\Delta Ns)] \approx -1\% = \Delta\alpha \tag{33}$$

where (ΔNm) and (ΔNs) are only numerical values.

From equation 12 it is seen that the corrected meter reading Nc=Nm−Ns will be 100% accurate as long as the sensing rotor 22 is operating normally (i.e. ΔNc=ΔNs=0). However, if the sensing rotor 22 is in error, the maximum possible error of the corrected meter registration, (ΔNc) maximum will not exceed the set limit of Δα since $$(\Delta Nc) \max = (\Delta Ns) \max = \bot \Delta\alpha\bot - (\Delta Nm) \leq \bot \Delta\alpha\bot \tag{34}$$

Now consider the case where the sensing rotor 22 is designed to rotate in opposite direction from that of the metering rotor 20 and again consider the abnormal condition where both the metering rotor 20 and the sensing rotor 22 may slow down due to increased bearing friction by the amount of (ΔNm) and (ΔNs) respectively. As in the previous case, the corrected meter registration Nc is no longer of 100% accuracy but will have an error (ΔNc) equal to the amount of slow down of the sensing rotor, namely $$\Delta Nc = \Delta Ns \tag{32}$$

If the limits of deviation from calibration Δα are set at ±1%, the limits Δα=±1% will be exceeded when the difference between the sensing rotor slow down ΔNs and the metering rotor slow down ΔNs reaches the set limit of ±1% approximately and this relationship is expressed as follows:

$$[(\Delta Ns)-(\Delta Nm)] \approx \Delta\alpha = \pm 1\% \text{ approximately} \tag{35}$$

From equations 32 and 35 it is seen that the corrected meter reading Nc=Nm−Ns will be 100% accurate as long as the sensing rotor 22 is operating normally (i.e., ΔNc=ΔNs=0), just like the previous case where the rotors rotate in the same direction. However, if the sensing rotor 22 is in error ($\Delta Ns \neq 0$), the maximum possible error of the corrected meter registration ($\Delta Nc$) max can exceed the set limit $\Delta\alpha = \pm 1\%$ without producing an indication of error. For example, assume the metering rotor 20 is 1% slow ($\Delta Nm = 1\%$), the sensing rotor 22 could slow down to say 1.5% resulting in an error of 1.5% slow down in the corrected meter registration ($\Delta Nc = \Delta Ns = 1.5\%$) without producing an indication that the set limit $\Delta\alpha = \pm 1\%$ has been exceeded since by equation (35)

$$[(\Delta Ns)-(\Delta Nm)]=[1.5\%-1\%]=+0.5\%<+1\%=\Delta\alpha$$

or still within the set limit $\Delta\alpha = \pm 1\%$ When the metering rotor speed has decreased by 1% it will take a decrease in the speed of the sensing rotor of at least 2% and thus resulting in at least a 2% meter error ($\Delta N_c = \Delta N_s = 2\%$) to indicate that the set limit of $\Delta\alpha = \pm 1\%$ has been exceeded since $$[\Delta Ns - \Delta Nm] = [2\% - 1\%] = \pm 1\% = \Delta\alpha$$

From the above description it is clear that two rotors rotating in the same direction at normal conditions is the preferred design for "self-checking" in case the sensing rotor 22 may also be in error due to abnormal conditions, even though the probability of such occurrence is small.

From the foregoing analyses it may be concluded that a meter employing a sensing rotor which rotates in the opposite direction from that of the metering rotor at a speed substantially the same as the metering rotor such as disclosed in the aforementioned patent to Griffo, will provide some improvement over the accuracy obtainable from conventional meters and that a meter in which the sensing rotor rotates at a significantly lower speed than that of the metering rotor will provide a still further improvement in meter accuracy regardless of the relative direction of rotation of the two rotors. However, a meter in which the two rotors rotate in opposite directions does not provide a reliable indication of malfunction (self-checking). Therefore, optimum performance is achieved when the sensing rotor is designed to rotate in the same direction as that of the metering rotor at a speed of one order of magnitude less than the speed of the metering rotor. It will be understood, however, that a meter in which the sensing rotor rotates at a significantly lower speed than that of the metering rotor is within the purview of the invention described herein regardless of the relative direction of rotation of the rotors.

It is a common practice in the turbine meter art to provide "straightening" vanes upstream from the metering rotor similar to vanes 57 (FIG. 1) of the meter herein described to minimize any tangential velocity components in the direction of fluid flow before it enters the blades of the metering rotor. However, disturbances or obstructions upstream of the meter may cause a "swirl" (impart a tangential component) in the fluid flowing into the meter which may not be entirely removed by the straightening vanes. Also, such disturbances may cause a non-uniform velocity distribution in the fluid flowing into the meter. In other words, the axial velocity of the fluid at various points of the meter inlet section may vary considerably and non-uniformly. In conventional meters any such swirl or non-uniform velocity distribution in the fluid entering the metering rotor will adversely affect the meter accuracy. Tests have established that a meter employing the invention described herein is relatively insensitive to such phenomena. In other words, the accuracy of a meter employing the instant invention is not adversely affected by any swirl or non-uniform velocity distribution in the fluid entering the meter rotor.

The manner in which the outputs from the metering rotor and sensing rotor are processed to produce a corrected meter registration will now be described by reference to FIG. 10. In an embodiment where the speed of the metering rotor at calibration is found to produce a registration of 105.3%, the speed of the sensing rotor produces 5.3% registration so that by subtracting the sensing rotor output from the metering rotor output the difference is representative of 100% registration as shown by equation 12. The system shown in FIG. 10 counts the number of pulses Pm from the metering rotor as produced by sensor 102 for every 500 pulses Ps from the sensing rotor as produced by sensor 146. In this embodiment 500 pulses form the sensing rotor is equivalent to 57.34 ft$^3$ of fluid flow through the meter 10 at calibration. In FIG. 10 a sequencer 154 includes logic elements adapted to provide a sequential ordering of commands to the various other elements of the system and a timing circuit which provides timing pulses of a frequency in the order of 100 KHz. The sampling interval is the time it takes for the counter 151 to accumulate 500 pulses from sensor 146. At start-up all of the counters and latches are initialized and, therefore, contain no counts and have no values at their respective outputs and the sequencer 154 is in its initial mode awaiting a signal from counter 151 signalling that the counter has accumulated 500 pulses. As soon as the counter 151 accumulates 500 pulse counts it sends a signal to the sequencer which causes the sequencer 40 to index to its second mode in which it transfers the pulse counts on counters 151 and 155 to latches 157a and 157b respectively. This is done by sending a transfer signal to the latches 157a and 157b which conditions the latches to accept the pulse count signals from the respective counters. This transfer signal also causes the sequencer to automatically index to its third mode by means of feedback of the transfer signal to the sequencer. In its third mode the sequencer sends a reset to both counters 151 and 155 to reset them to their initial condition to accumulate more pulse counts from the sensors. The accumulation of 500 pulses in counter 151 takes a relatively long period of time compared to the time it takes the system to process the signals from the counters and latches and, therefore, the sequencer will remain in its first mode a relatively long period of time compared to the time it takes to index through its subsequent modes. It will be understood that the purpose of the latches is to accept and store the counts from the sensors 102 and 146 at the end of each 500 pulses from sensor 146 so that the counters may at the end of each such interval be immediately conditioned to begin counting a new series of pulses from the sensors while the pulse counts accumulated during the preceding sampling interval are being processed. Again the reset signal to the counters is fed back to the sequencer to automatically index the sequencer to its fourth mode.

In its fourth mode the sequencer sends a command signal to the multipliers 152 and 156 which conditions them to accept respectively the signal values appearing at the outputs of latches 157a and 157b. The multipliers then perform a process which multiplies the value of the signals from the latches 157a and 157b respectively by scaling factors Ks and Km. These factors are programmable and represent the number of pulses produced by the metering rotor and the sensing rotor respectively for each cu. ft. of fluid passing through the meter at calibration which factors are determined for each meter individually at initial calibration.

Upon completion of the multiplication process the multipliers send a completion signal to the sequencer which causes it to index to its fifth or subtract mode. In this mode the sequencer sends a signal to the subtractor 158 which conditions it to accept the binary signals from the multiplier. The subtractor then performs the process of subtracting the value of the signal for multiplier 152 from the value of the signal from multiplier 156, upon completion of which process, the subtractor sends a process completed signal to the sequencer causing it to index to its sixth mode. The output from the subtractor is a binary signal and represents the number of cu. ft. passing through the meter during each sampling interval of 500 pulses from the sensing rotor. In its sixth mode the sequencer signals the down counter 159 to accept the binary output signal from subtractor 158. Again, the transfer signal is fed back to the sequencer causing it to automatically index to its seventh and final mode.

In its final or decrement mode the sequencer simultaneously signals the down counter 159 and divide-by counter 161 to accept timing pulses from the timing circuit in the sequencer. For each timing pulse received by the down counter it is decremented one pulse count. At the same time the divide-by counter accepts pulses from the timing circuit so that for each count by which the down counter is decremented the divide-by counter receives and accumulates one pulse count. Thus, by this process the pulse count impressed on the down counter from the subtractor is transferred to the divide-by counter.

For each 10,000 pulses received by the divide-by counter it produces 1 pulse which is applied to the register 160 which causes it to increment in units of 1 cu. ft. of volume. Thus, for each pulse received from the divide-by counter (and for each 10,000 pulse counts by which the down counter is decremented) the register 160 indicates an additional 1 cu. ft. of fluid as having been passed through the meter. After the divide-by counter has produced one pulse for each even 10,000 timing pulses received it will receive and hold any remaining number of pulses from the down counter less than 10,000 which remainder will be carried over and added to the next series of pulses transferred from the down counter. When the down counter is decremented to zero by the timing pulses, it sends a decrement completed signal to the sequencer which causes it to index to its initial mode thereby disabling the down counter and divide-by counter from accepting any more timing pulses and returning the system to its initial condition so that the entire process may be repeated upon receipt of the next 500 pulses at counter 151.

In the embodiment herein described, the slotted disc 104 produces 4 pulses for each revolution of the metering rotor and the slotted disc 148 produces 7 pulses for each revolution of the sensing rotor. In such an arrangement it can be shown that for each 500 pulses Ps produced by the sensing rotor, the average number of pulses Pm produced by the metering rotor over a number of sampling intervals is given by the expression $$Pm = \frac{4}{7} \times Ps \times 1.0103 \times \left(1 + \frac{100}{\overline{a}^* + \Delta a}\right) \quad (36)$$

where
1.0103 is a meter constant which takes into account the slight difference in the effective flow area between the two rotors and also the wake effect and fluid coupling effect between the two rotors and is generally close to unity. Its exact value is to be determined during calibration.
$\overline{a}^*$ = the % adjustment or registration of the sensing rotor at calibration.
$\Delta a$ = % deviation from calibration.

In this embodiment, calibration shows that the sensing rotor registration is 5.3%. Therefore, the average number Pm of pulses from the metering rotor at calibration for each 500 pulses from the sensing rotor is determined by equation (36) for $a^* = 5.3$ and $\Delta a = 0$ as $$Pm = \frac{4}{7} \times 500 \times 1.0103 \left(1 + \frac{100}{5.3 + 0}\right) = 5735.018$$

It will be understood that the fractional number (5735.018) of pulses is an average value which would be obtained by averaging the actual number of pulses received from the metering rotor over several successive sampling intervals and that the actual number of pulses received in any given sampling interval may vary several pulses above or below this average value. As mentioned above, 500 pulses from the sensing rotor represents 57.34 ft³ of fluid flow through the meter at calibration; that is when $\Delta a = 0$. Therefore, at calibration when 500 pulses have been counted by counter 151, counter 155 will have accumulated an average of 5735.018 pulses and, therefore, the signals appearing at the output of counter 155 and output of latch 157b will have an average value of 5735.018 when the outputs from counter 151 and latch 157a have a value of 500. The multipliers 156 and 152 multiply the signals from the latches 157b and 157a respectively by factors Km and Ks. The rotor factors Km and Ks are determined at the time of calibration and represent the cu. ft. of registration for the respective rotors for each pulse produced by the rotors. The factor Km is found by multiplying the flow through the meter as shown by the prover (57.34 ft³) by a factor of 1.053 (the registration of the metering rotor = 105.3%) and dividing by the number of pulses Pm from the metering rotor.

$$Km = \frac{57.34 \times 1.053}{5735} = .010528 \text{ ft}^3/Pm$$

As in the case of Km, sensing rotor factor Ks is found by multiplying the flow through the meter by a factor of 0.053 (the registration of the sensing rotor = 5.3%) and dividing the pulses Ps from the sensing rotor.

$$Ks = \frac{57.34 \times .053}{500} = .006078 \text{ ft}^3/Ps$$

The signal from the latch 157b having an average value of 5735.018 pulse counts is multiplied in multiplier 156 by Km to produce a binary output having an average value representing 60.378/ft³. Similarly the signal from the latch 157a having a value of 500 pulse counts is multiplied in multiplier 152 by Ks to produce a binary output having a value representing 3.0390 ft³.

The signals from the multipliers 156 and 152 representing respectively values which average 60.378 ft³ and 3.039 ft² are applied to the subtractor 158 which subtracts the latter from the former to produce a binary output having an average value representing 57.339 ft³. The binary output from the subtractor is applied to the down counter in such form that 573390 timing pulses from the timing circuit will be required to decrement the down counter to zero. As explained above, the divide-by counter 160 produces an output pulse for each 10,000 timing pulses received by it and thus it will produce 570,000/10,000 or 57 pulses to the electromechanical register 160 causing it to register 57 ft³ of flow through the meter. The remaining 3390 pulses will be retained by the divide-by counter and will be added to the pulses transferred to it from the down counter during the next sampling interval. Through successive sampling intervals the net effect of the system will be to subtract the output of the sensing rotor from the output of the metering rotor to provide an accurate indication of flow on the register 160. It will be understood that since register 160 increments in units of 1 ft³, fractional values of ft³ will be held for succeeding sampling intervals.

It should be noted that the signal from multiplier 156 representing a metering rotor registration of 105.3% and having an average value of 60.378 ft³ and the signal from multiplier 152 representing 3.0390 ft³ or 5.3% registration are processed by subtractor 158 in accordance with equation (12) so that $$Nc = 60.378 - 3.039 = 57.339 \text{ (100\% registration)}$$

If in the course of service the speed of the metering rotor decreases some amount below its calibrated value e.g. 2% to 103.3% registration, an increase in exit angle $\theta$ will result. This increase in the exit angle $\theta$ of the flow from the meter rotor 20 will cause the sensing rotor 22 to decrease its speed or registration Ns by 2% to 3.3% registration. If the rate of fluid flow though the meter 10 remains constant it will take a longer time period for the sensing rotor to produce 500 pulses and as a result more fluid will flow through the meter 10 while the sensing rotor 22 is producing 500 pulses. This new increased amount of fluid flow may be calculated by multiplying the at-calibration flow by the ratio of the sensing rotor registration at calibration (5.3%) to the new registration (3.3%)

$$57.34 \times (5.3/3.3) = 92.09$$

Therefore, when the metering rotor 20 slows down 2%, 92.09 ft³ of fluid will flow through the meter for each 500 pulses from the sensing rotor 22. Also, because it takes a longer time period for the sensing rotor to produce 500 pulses Ps, the number of pulses Pm will be increased. The new average number of pulses Pm for 500 Ps may be calculated from equation (36) in which $\Delta\alpha = -2\%$ or from the expression $$Pm = Pm^* \times (Rm/Rm^*) \times (Rs^*/Rs) \quad (37)$$

where
  Pm* = average number of pulses from metering rotor at calibration
  Pm = new average number of pulses from metering rotor
  Rm* = rate of metering rotor registration at calibration
  Rm = new rate of registration of metering rotor
  Rs* = rate of registration of sensing rotor at calibration
  Rs = new rate of registration of sensing rotor substituting $$Pm = 5735 \left(\frac{103.3}{105.3}\right) \times \left(\frac{5.3}{3.3}\right) = 9035.8$$

Therefore, when the speed of the metering rotor 20 slows down from its calibrated value by 2%, it will produce an average number of 9035.1 pulses while the sensing rotor is producing 500 pulses.

Therefore, over several successive sampling intervals the pulse count from the latch 157b to the multiplier 156 will have an average value of 9035.8 which when multiplied by Km will produce an output signal having an average value of 95.129 ft³ which corresponds to 103.3% registration while 92.09 ft³ of fluid actually flows through the meter. Since the sensing rotor still produces 500 pulses during this time interval, the signal from the multiplier 152 still produces a signal representing 3.039 ft³ which now corresponds to 3.3% registration. When the two signals are processed by subtractor 158 to subtract the value of the signal from the multiplier 152 from the value of the signal from multiplier 156, the subtractor will produce an output signal having an average value of 92.09 which corresponds to 100% registration.

If the metering rotor is caused to run 2% faster than its calibrated value, by employing the same process described above, it will be found that while the sensing rotor is producing 500 pulses, 41.6297 ft³ of fluid will pass through the meter and over several successive sampling intervals the pulse count from the latch 157b to multiplier 156 will have an average value of 4242.85, which when multiplied by Km will produce an average output signal representing 44.6687 ft³ which corresponds to 107.3% registration. The subtractor subtracts the signal from multiplier 152 which has a value of 3.0390 from the value of the signal from multiplier 156 which has a value averaging 44.6687 ft³ to produce an average output signal representing 41.6927 ft³ corresponding to 100% registration. Thus, it can be seen that by subtracting the volume as represented by the number of revolutions of the sensing rotor from the volume as represented by the number of revolutions of the metering rotor the result will always be representative of 100% registration at all values of speed of the metering rotor so long as there is no malfunction of the sensing rotor.

FIG. 11 shows a system for implementing the self-checking feature of the invention. The pulses Pm from the metering rotor are fed through amplifier 186 to counter 188 where they are counted to produce a digital output which is applied to comparator 190. The pulses Ps from the sensing rotor are fed through amplifier 180 to counter 182. A bank of thumbswitches 184 may be set to condition counter 182 to produce one output pulse for a selected number of Ps pulses input into the counter 182. In the embodiment described, the counter 182 is conditioned to produce one output pulse for each 500 pulses Ps from the sensing rotor. The interval between two successive pulses from counter 182 define the sampling interval for the FIG. 11 system. During this sampling interval the counter 188 accumulates pulses Pm. Each pulse from the counter 182 is used as an enabling signal to cause comparator 190 to compare the number of pulses in counter 188 against the upper and lower limit numbers set by thumbswitches 192 and 194. Comparator 190 contains logic elements which upon completion of the comparison process cause the counter 188 to be reset to zero and counter 182 to be reset to the value set by thumbswitch 184 thereby initiating a new sampling interval.

Figure 9:
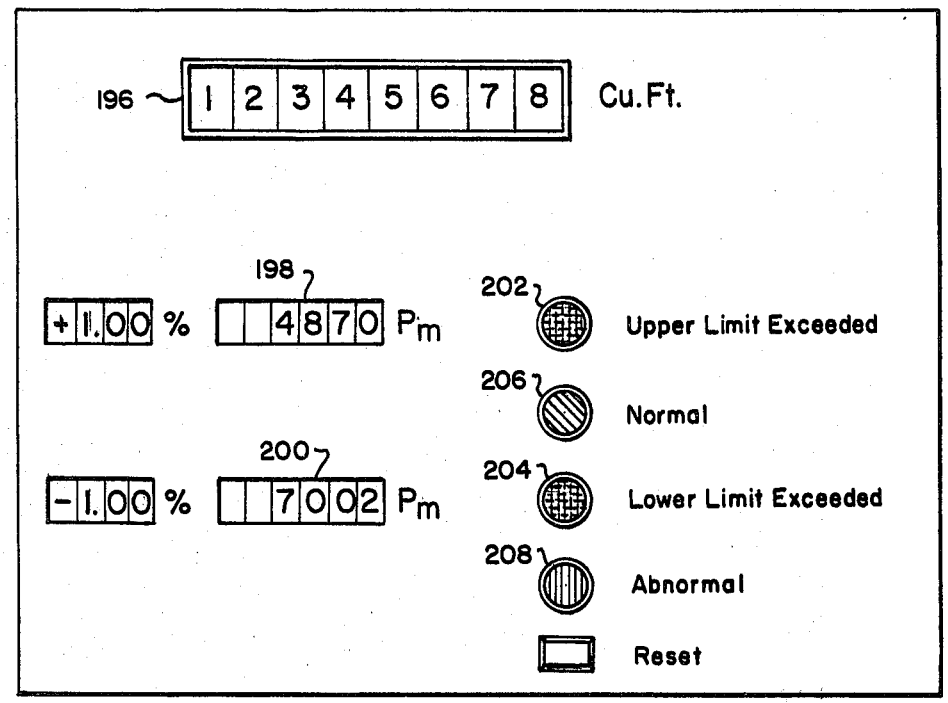
FIG. 9 is the front panel of the electronic box of such a meter on which the various values, limits, etc., of the parameters involved in the instant invention are displayed.

Thumbswitches 192 and 194 are connected to the comparator 190 to respectively condition the comparator 190 to the selected upper and lower limits of accepted deviation in the actual number of pulses Pm from the calibrated value for each 500 pulses from the sensing rotor. FIG. 9 shows a display panel on which the corrected registration is shown at 196 and the selected upper limit as set by switches 192 is shown at 198 and the selected lower limit is shown at 200.

The relationship between the average number of pulses Pm from the metering rotor and the number of pulses Ps from the sensing rotor in the embodiment in which the metering rotor disc 104 produces 4 pulses for each revolution and the sensing rotor disc 148 produces 7 pulses for each revolution is expressed by the equation 17 given previously. Therefore, $$Pm = (4/7) \times Ps \times 1.0103 \times \left(1 + \frac{100}{a^* + \Delta a}\right) \quad (36)$$

In the embodiment described where at calibration $a^* = 5.3\%$ and $\Delta a = 0$, and for every 500 pulses Ps from the sensing rotor $$Pm^* = (4/7) \times 500 \times 1.0103 \times \left(1 + \frac{100}{5.3 + 0}\right)$$

or
$Pm^* = 5735$ pulses

Thus, when the meter is functioning at calibrated values, for each pulse to the comparator 190 from counter 182, a binary signal will be applied to the comparator 190 from counter 188 which is representative of 5735 pulses Pm from the metering rotor. It will be understood that in the following discussion relating to self-checking, the calculated pulse count values and those shown in the table below have been rounded off to their nearest whole number values.

If it is desired to operate the metering rotor within deviation limits the ±1%, substituting in the equation (36) when $\Delta a = -1\%$ $$Pm = \frac{4}{7} \times 500 \times 1.0103 \times \left(1 + \frac{100}{5.3 + (-1)}\right) = 7002 \text{ pulses}$$

and when $\Delta a = +1\%$ $$Pm = \frac{4}{7} \times 500 \times 1.0103 \left(1 + \frac{100}{5.3 + 1}\right) = 4870 \text{ pulses}$$

Thus, if it is desired to operate the metering rotor within the deviation limits of ±1%, the switches 192 and 194 will be set to condition comparator 190 for 4870 pulses and 7002 pulses respectively. With the comparator 190 so conditioned, if the signal from counter 188 sensed by the comparator 190 is indicative of a number of metering rotor pulses between the limits of 7002 and 4870 for each enabling pulse from the counter 182, the comparator 190 will produce an output signal to the "normal" indicator light 206 to indicate the metering rotor is operating within the prescribed limits of accuracy. If the signal to the comparator from counter 188 is indicative of more than 7002 pulses Pm for each enabling pulse from the counter 182, the comparator 190 will produce an output to "lower limit exceed" indicator light 204 to indicate that the speed of the metering rotor or the speed of the sensing rotor is more than 1% slower than their calibrated values or that their combined deviation is more than 1% slower than their calibrated values. If the signal to the comparator 190 from counter 188 is indicative of less than 4870 pulses Pm for each enabling pulse from the counter 182, it will produce an output to "upper limit exceed" indicator light 202 to indicate that the speed of the metering rotor or the speed of the sensing rotor is more than 1% faster than their calibrated values or that their combined deviation is more than 1% faster than their calibrated values. Comparator 190 also contains a circuit which counts the number of successive comparisons for which the pulses Pm are outside of the prescribed limits and if this abnormality persists for a given number of comparisons, for example 15, the comparator 190 will produce an output to "abnormal" indicator light 208 to indicate that the abnormality in operation is not a transient condition.

It is important to note that by designing the sensing rotor 22 to rotate at a much lower speed (generally one order of magnitude less) than that of the metering rotor and thus also resulting in even much lower thrust load on the sensing rotor bearings than on the metering rotor bearings, the sensing rotor 22 generally has much less chance of malfunction than the metering rotor 20. Therefore, when the "out of limit" indicator lights turn on, it most likely means that the metering rotor is operating beyond the chosen limit but the corrected meter reading $Nc = Nm - Ns$ remains at calibration value or 100% accuracy.

Below is a chart with $Ps = 500$ pulses showing the upper and lower metering rotor pulse limits for all values of deviation between 0 and ±4.00% for the embodiment described above where the registration at calibration of the sensing rotor is 5.3%. With such a chart, an operator can set any desired limits of accuracy drawn by simply adjusting the setting of switches 192 and 194 to the pulse values shown for the desired limits of accuracy. Since the calibrated value of the sensing rotor speed will vary slightly with each meter a similar chart must be provided for each meter showing the pulse values for the range of accuracies peculiar to the calibrated value of the sensing rotor speed for each meter.

| Δα | Pm | Δα | Pm |
|---|---|---|---|
| 0 | 5735 = Pm | | |
| −0.10 | 5840 | +0.10 | 5634 |
| −0.20 | 5949 | +0.20 | 5537 |
| −0.30 | 6062 | +0.30 | 5443 |
| −0.40 | 6180 | +0.40 | 5353 |
| −0.50 | 6302 | +0.50 | 5265 |
| −0.60 | 6430 | +0.60 | 5181 |
| −0.75 | 6633 | +0.75 | 5060 |
| −1.00 | 7002 | +1.00 | 4870 |
| −1.25 | 7416 | +1.25 | 4696 |
| −1.50 | 7885 | +1.50 | 4534 |
| −1.75 | 8420 | +1.75 | 4384 |
| −2.00 | 9036 | +2.00 | 4243 |
| −2.50 | 10598 | +2.50 | 3989 |
| −3.00 | 12839 | +3.00 | 3766 |
| −3.50 | 16325 | +3.50 | 3569 |
| −4.00 | 22493 | +4.00 | 3392 |

It will be noted that the parenthetical portion of equation (36) is proportional to the ratio of the speeds of the two rotors as well as the ratio of the pulses. Thus, when both rotors are operated at calibrated values, $$Ns = 5.3\% \text{ and}$$
$$Nm = 105.3\%$$
$$\frac{Nm}{Ns} = \frac{105.3}{5.3} = 19.87$$

Similarly, substituting in the parenthetical portion of equation (36)

$$\left(1 + \frac{100}{a^* + \Delta a}\right) = \left(1 + \frac{100}{5.3 + 0}\right) = 19.87$$

Thus, it may be stated $$\frac{Nm}{Ns} = \frac{(Pm/4)}{(Ps/7)(1.0103)} = \left(1 + \frac{100}{a^* + \Delta a}\right) \quad (34)$$

The foregoing description and the systems shown in FIGS. 10 and 11 contemplate using a pre-selected number of pulses from the sensing rotor to define a time interval during which pulses from the metering rotor are counted the number of pulses from the metering rotor being combined with and/or compared to the pre-selected number of pulses from the sensing rotor to provide a corrected registration as well as an indication of deviation from calibration. It will be understood as an alternative that a pre-selected number of pulses from the metering rotor could be counted to define a time interval during which the pulses from the sensing rotor are counted, the pulses from the two rotors thus being combined and/or compared in accordance with the teachings herein. Also, it is possible to provide a real time clock in the system of FIG. 10 and 11 and count the pulses produced from each rotor during a given time interval as defined by the clock. Such a system will hereinafter be described with respect to FIGS. 13–18F.

Figure 13:
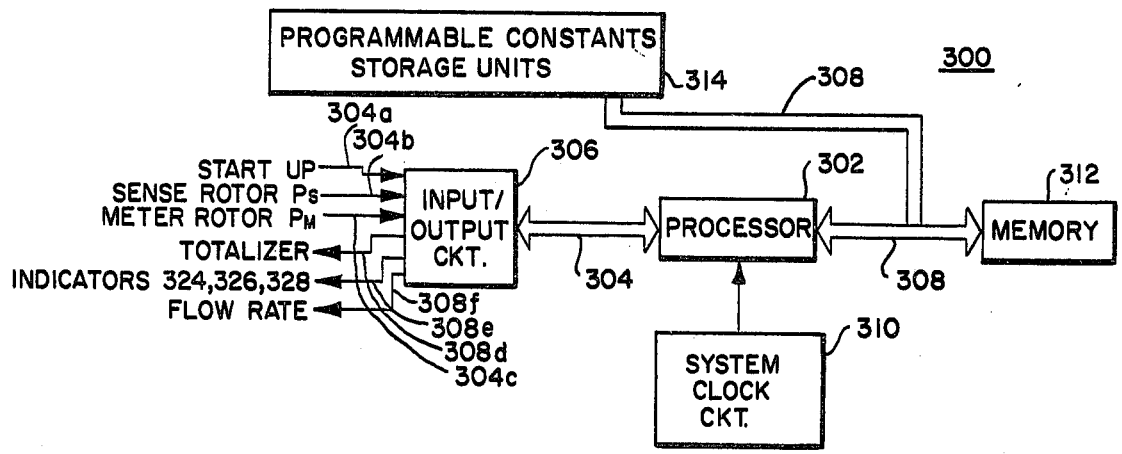
FIG. 13 is a functional block diagram of the computer architecture implementing a process in accordance with a further embodiment of this invention.
Figure 14:
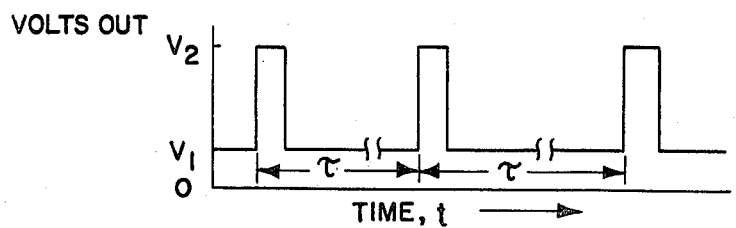
FIG. 14 illustrates a timing signal as developed within the system of FIG. 13.
Figure 15:
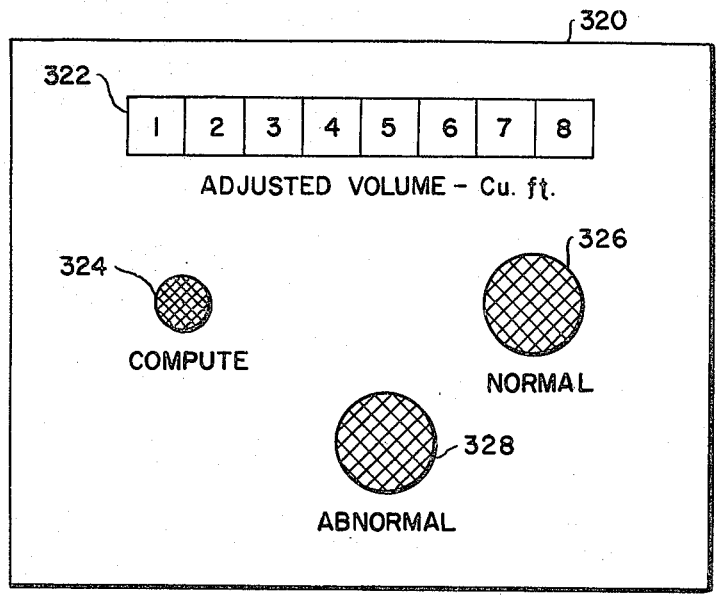
FIG. 15 shows a display board for providing a manifestation of fluid flow and for providing warning signals.
Figure 16:
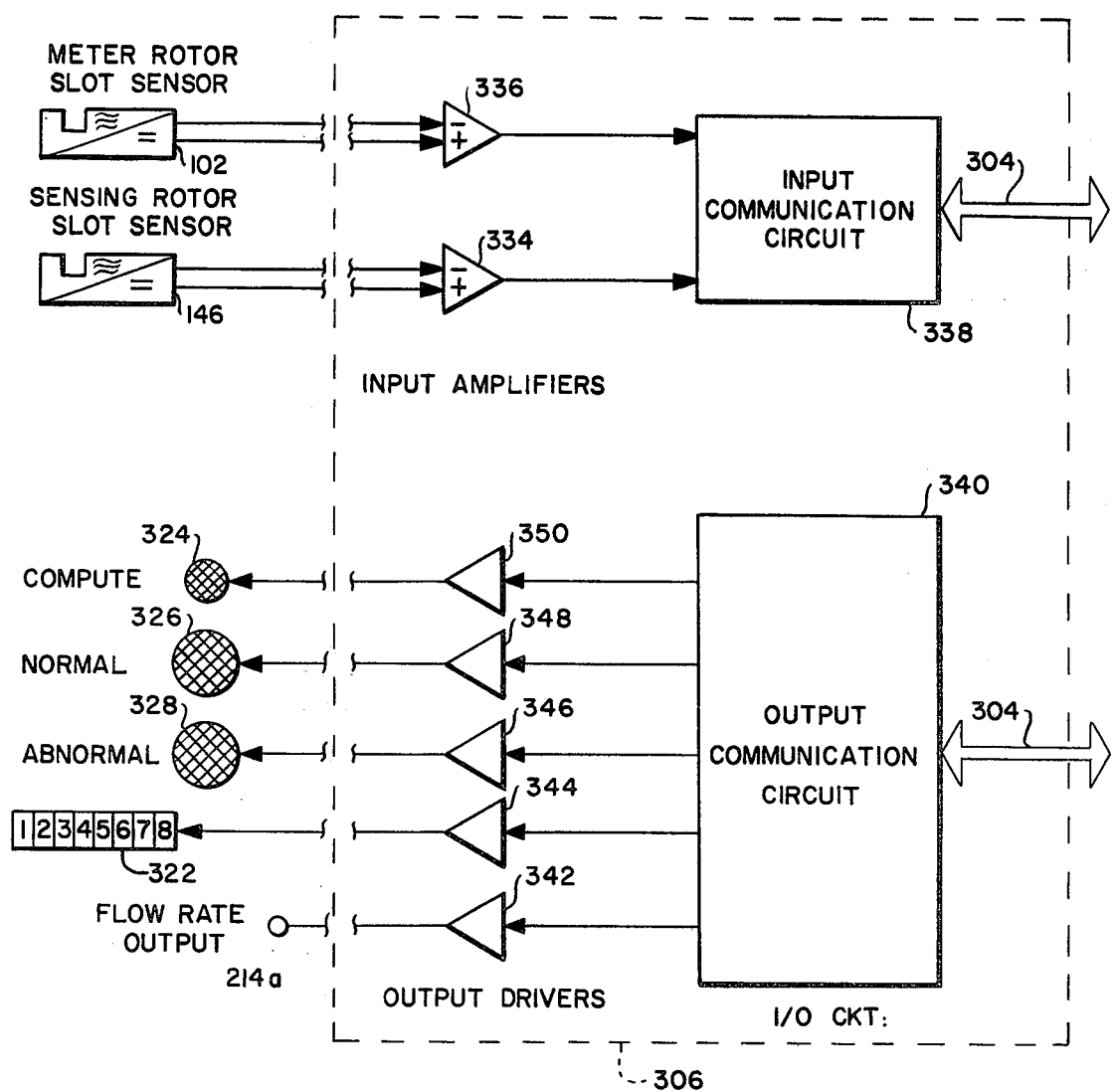
FIG. 16 is a more detailed functional block diagram of a portion of the system of FIG. 13.

As indicated in FIG. 13, the computer system 300 implements an embodiment of this invention in which a program is stored in a memory 312 which uses constants stored in a programmable constant storage unit 314 and is executed under the control of a processor 302 which may be of the type sold by assignee hereof under part designation R6502-11. A clock circuit 310, the output of which is indicated in FIG. 14, applies a series of pulses to provide the system clock to the processor 302. Input and output signals are directed into and out of the system 300 via an input/output circuit 306. As further illustrated in FIG. 16, the velocities of the meter rotor 20 and the sensing rotor 22 are sensed respectively by slot detectors 102 and 146 to derive signals to be applied via amplifiers 336 and 334 respectively to an input communication circuit 338, as illustrated in FIG. 16 as part of the input/output circuit 306. Both the memory 312 and programmable constant storage unit 314 are coupled to the processor 302 via bus 308 (FIG. 13). The input/output circuit 306 also includes an output communication circuit 340 which is coupled via bus 304 to the processor 302 to provide output signals for variously energizing the display lights such as the compute display light 324, the normal display light 326 and the abnormal display light 328, as well as an electromechanical totalizer 322 whereby the current total of the measured fluid is displayed. As illustrated in FIG. 16, the output communication circuit energizes a plurality of drivers 344, 346, 348 and 350 to respectively actuate the indicating devices 322, 328, 326 and 324. In addition, the output communication circuit 340 provides a signal via the output driver 342 to provide a signal indicative of the flow rate through the meter 10. The display elements shown in FIG. 16 are mounted upon a display board 320 as shown in FIG. 15, whereby the totalizer 322 and the display lights 324, 326 and 328 may be readily observed by an operator.

Figure 17A:
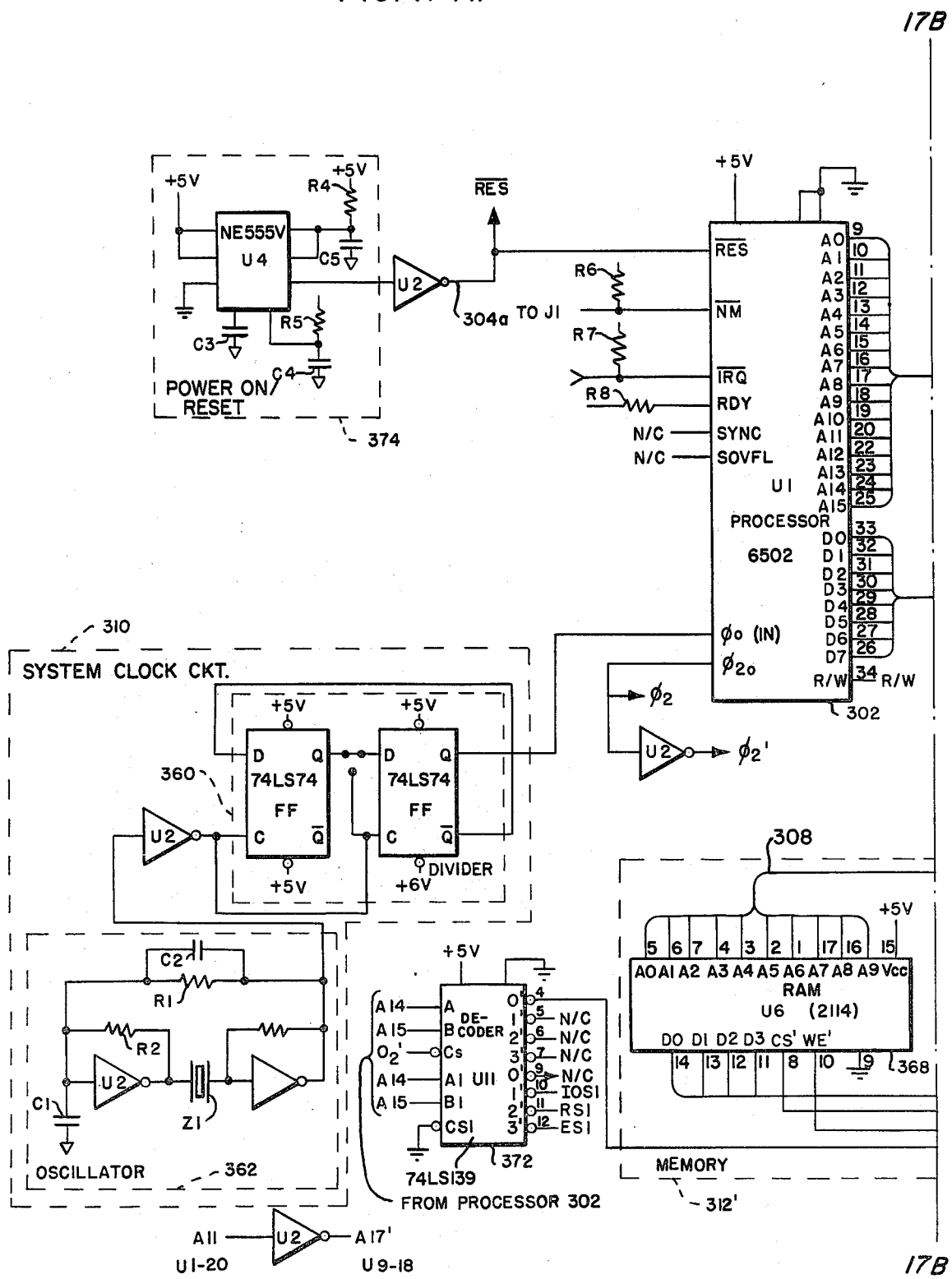
FIGS. 17A, 17B and 17C together comprise a detailed schematic diagram of the system of FIG. 13.
Figure 17B:
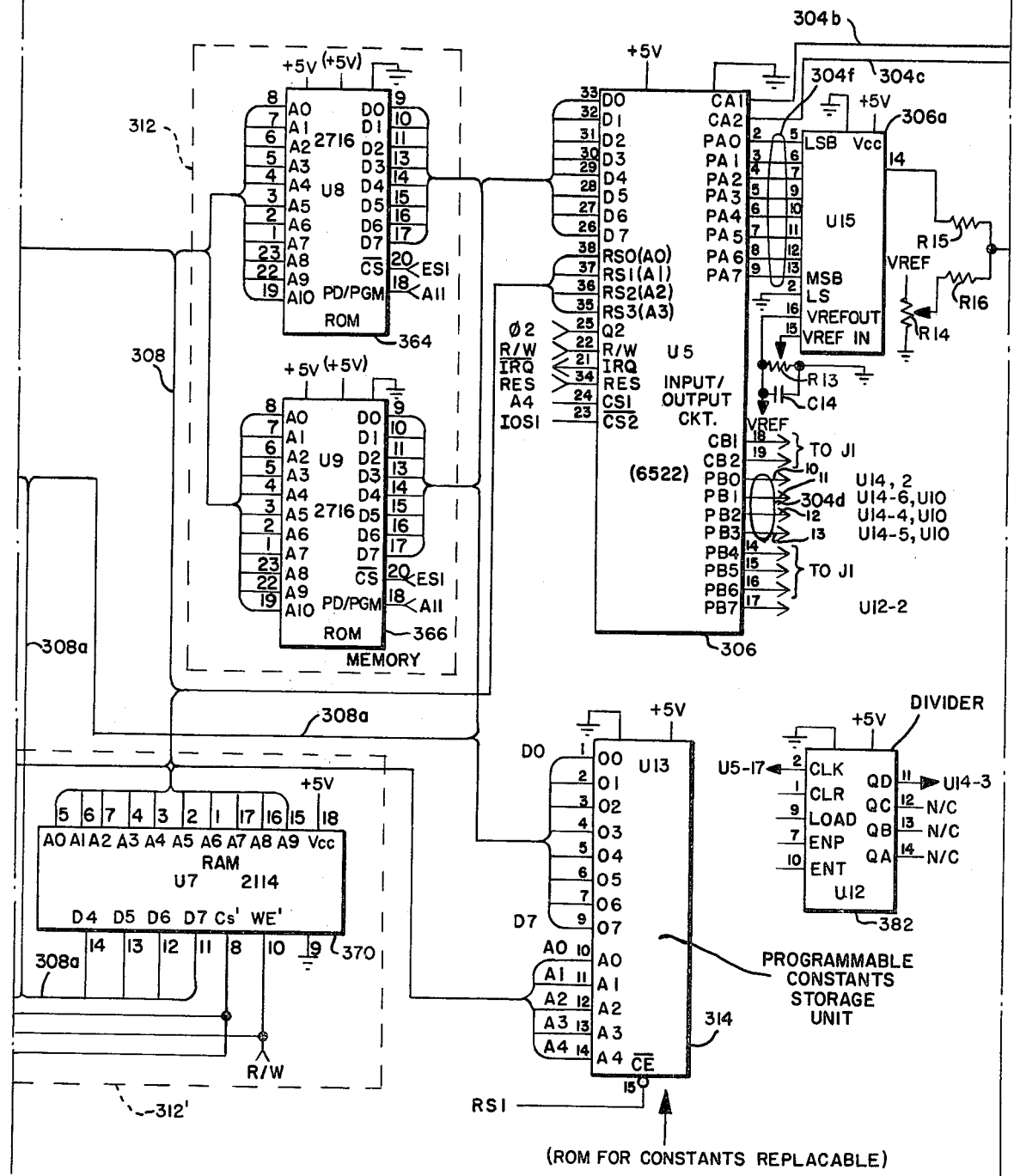
Figure 17C:
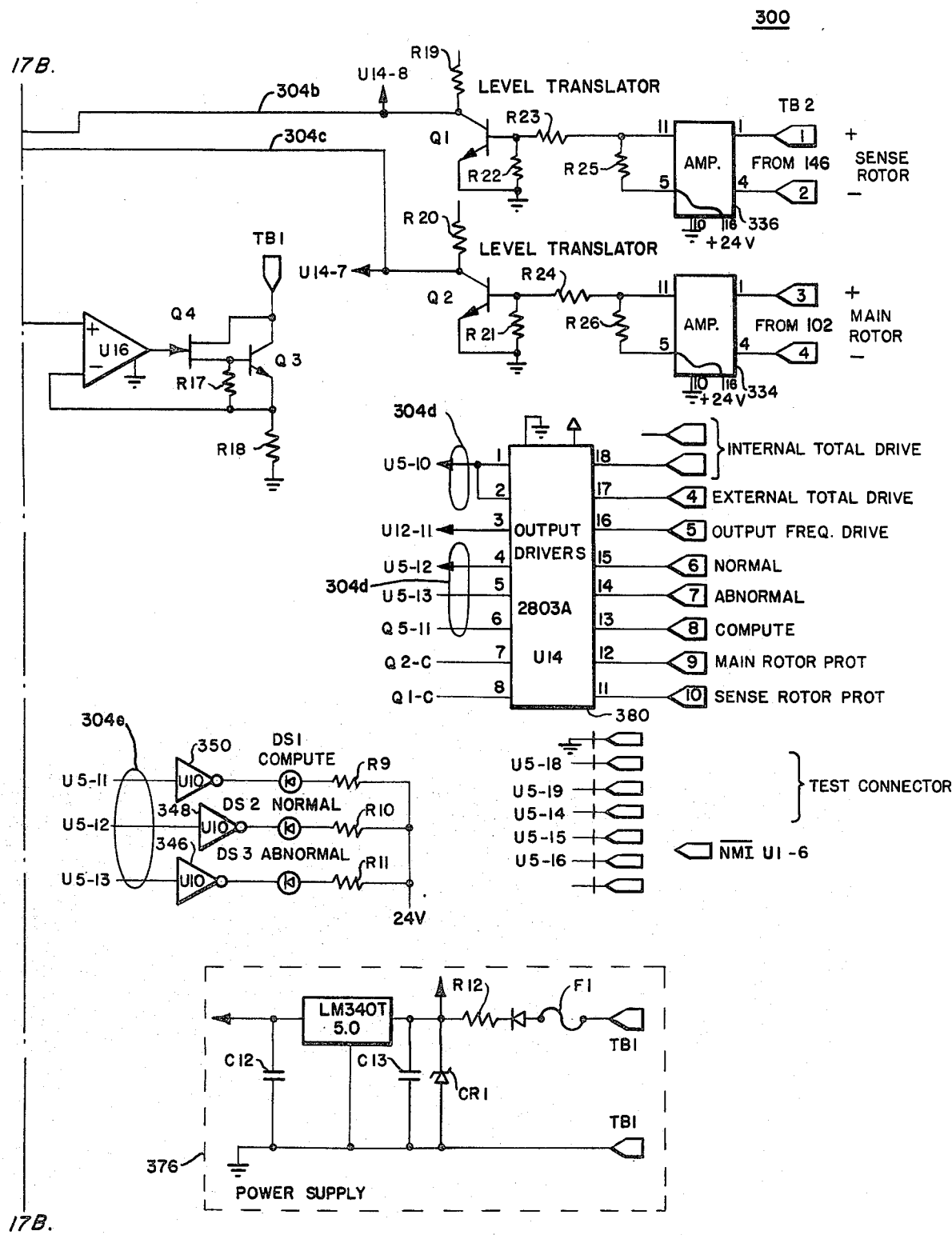

In FIGS. 17A, 17B and 17C, there is shown a more detailed functional block diagram of the computer system 300, with like numbers indicating like elements. The slot detectors 146 and 102 (FIG. 17C) are coupled respectively to the terminals 1 and 2 and 3 and 4 whereby the corresponding inputs are applied through amplifiers 336 and 334 respectively, to level translators comprised essentially of transistors Q1 and Q2. The level shifted outputs are taken from the collectors of transistors Q1 and Q2 and applied along lines 304b and 304c to the inputs CA1 and CA2 of the input/output circuit 306 (FIG. 17B), which may be of the type sold by the assignee hereof under part designation R6522-11. Outputs are derived from the pins 10, 11, 12 and 13 of the input/output circuit 306 and applied via a group of lines collectively identified by the reference numeral 304d to the drive array 380 (FIG. 17C) to variously provide signals indicative of the totalized flow and the presence of normal, abnormal and compute conditions respectively. Additionally, a digital representation of the analog self-checking signal is provided by the input/output circuit 306 on pins 2 thru 9 collectively identified by the numeral 304f. Pins 11 to 13 of the input/output circuit 306 are also connected as shown in FIG. 17C via the group of lines 304e to the buffer amplifiers 346, 348 and 350 for energizing the indicating devices 324, 326 and 328. In addition, signals are derived from the collectors of the transistors Q2 and Q1 and are applied via the driver array 380 to provide signals indicative of the rotation of the main and sensor rotors.

A power supply 376 is shown whereby ±5 volts derived from an external source of d.c. voltage is applied to the various elements of the computer system 300. In FIGS. 17A and 17B, two distinct memories are disclosed. A first memory 312 comprises a pair of ROMs 364 and 366 is coupled via the address bus 308 and data bus 308a to the microprocessor 302. As illustrated, the most significant bits of the address bus from the processor 302 are applied to decoder 372, which during system operation and depending upon the status of those bits selects either ROM 364 or 366 as the device from which a certain location is to be read. ROMs 364 and 366 may be of the type sold by assignee under part designation R2332. During the initial development stage of the system EPROMs may be substituted form ROMs 364 and 366 whereby the program may be initially programmed and then reprogrammed as changes are incorporated into the system 300. Additionally, a second memory 312' is comprised of RAM elements 368 and 370 which are used as temporary data storage and is coupled to the processor 302 via address bus 308 and data bus 308a. The RAMs 368 and 370 which may be of the type sold by Intel Corporation under part designation P2114, are also addressed via the address decoder 372. In a manner similar to that used for ROM 364 and 366 as previously described, the decoder 372 provides a chip select signal to the RAMs 368 and 370, which enables these circuits to respond to the address on bus 308.

A power-on reset circuit 374 as shown in FIG. 17A is responsive on the initial application of the d.c. system power +5 volts, and produces a pulse which is applied via line 304a to reset the processor 302, whereby an initialization and power on routine is executed. A clock signal as illustrated in FIG. 14 is developed by the system clock circuit 310 which comprises an oscillator 362 having a crystal element Z1 oscillating at four MHz. The output of the oscillator 362 is divided by divider 360 comprised of a pair of flip-flops before being applied to the clock input of the processor 302 which further routes this clock signal to the remainder of the circuit. The programmable constants storage unit 314 is shown in FIG. 17B connected via address bus 308 and data bus 308a to memory 312 and processor 302 whereby a set of constants as programmed therein may be entered into the system 300. Divider 360 and storage unit 314 may be of the types sold by National Semiconductor Corporation under respective parts designations 74LS74 and DM8577N. Also, an analog circuit output indicative of and proportional to the error output may be derived from the digital representation of the output signals designated 304f produced by the input/output circuit 306 and appearing on pins 2 thru 9 thereof, in conjunction with the cascade coupled transistors Q4 and Q3 by the analog to digital converter 306a.

Equation (12) may be rewritten in terms of metering rotor and sensing rotor pulses as follows:

$$Vc = Pm/Km - Ps/Ks \tag{38}$$

where Vc is the corrected volume in cu. ft. flowing through this meter during a given period of time; Pm and Ps are respectively the pulses from metering rotor and sensing rotor accumulated during said period of time and Km and Ks are respectively the meter and sensing rotor factors in pulses per cu. ft. of flow through the meter which factors are determined, at the time of initial calibration. The system 300 operates to sense and count the number of pulses Pm and Ps produced respectively by the metering rotor and sensing rotor, and to solve equation (38) to provide an indication of corrected volume Vc.

The corrected volume calculation is performed at the conclusion of a continuously occurring 1-second time base, said time base being determined by a counting interval set by the timing signal (1 second) supplied by the system clock circuit 310. In turn, the calculated corrected volume Vc is applied repeatedly after each such 1-second timing interval to the electromechanical totalizer 322, whereby the values of flow are summed over a period of time to give a total amount of flow of the fluid through the meter 10 during that time. Furthermore, the computer system 300 is designed i.e., programmed, to implement various checks on the operation of the meter 10. For example, if the speed of the metering rotor 20 significantly decreases from its calibrated value beyond prescribed limits as hereinafter described, an error or malfunction condition is noted. Typically, the sensing rotor 22 is designed to rotate at a significantly slower speed (one order of magnitude less) than that of the metering rotor 20. Under such conditions, it is normally expected that the bearing of the metering rotor 20 will degrade before that of the sensing rotor 22, with the result that the speed of the meter rotor 20 will significantly decrease from its calibrated value beyond the prescribed limits. In such an event the factor Pm/Km becomes less than the factor Ps/Ks. Thus to detect such a condition, the system 300 periodically checks the magnitude of (Pm/Km) relative to the magnitude of (Ps/Ks). If (Pm/Km) is less than (Ps/Ks), then the adjusted volume Vc is given by the following equation:

$$Vc = Ps/Ks \tag{39}$$

The adjusted volume Vc as indicated by equation 39 is an approximation of the fluid flow. In addition, upon detecting the condition where Pm/Km is less than Ps/Ks an error condition is indicated and the abnormal display light 328 will be energized, as hereinafter described.

Further, self-checking is accomplished by determining the percentage of deviation $\Delta a$ of the sensor rotor speed from its calibrated value in accordance with the following equation 40 which may be derived from equation (36)

$$\Delta a = \left( \frac{100}{\frac{Pm\ Ks}{Ps\ Km} - 1} \right) - \overline{a^*} \tag{40}$$

The deviation of the sensor speed from its initially calibrated value is continually calculated. In the self-checking calculation, the system 300 senses a predetermined number of pulses $P_m$ from the meter rotor and when this number equals the predetermined number, e.g. 25,000, corresponding to 50 seconds of maximum flow rate, equation 40 is solved and the calculated value of $\Delta a$ is compared with limits $\pm \Delta ap$ as preset by programmable unit 314. If the preset limits are exceeded, i.e., $\bot\Delta a\bot$ greater than $\bot\Delta ap\bot$ then the meter is operating outside the chosen error limits and the abnormal display light 328 will be periodically energized. If however, the value of $\bot\Delta a\bot$ is less than the preset limits $\bot\Delta ap\bot$, then the meter 10 is operating normally and the normal display light 326 is energized.

The computer system 300 also has the capability of providing an indication of flow rate F in terms of frequency (Hz) in accordance with the following equation:

$$F = \left(\frac{P_m/K_m}{Q \max}\right) \times \left(\frac{100}{100 + a^*}\right) \times f\max \qquad (41)$$

where $P_m$ is the meter rotor speed pulse rate in terms of pulses per hour, which in turn equals 3600 $P_{m/t}$ in seconds, where t is a sampling interval, e.g. one second, Q max is the rated flow rate of the meter 10 in cu. ft. per hour, and fmax is the desired maximum output frequency at maximum flow. The program as stored and implemented by the system 300 calculates the flow rate F in accordance with equation 41 based on a pulse counting interval of t, e.g. one second, as determined by the clock signal derived from the system clock circuit 310. The flow rate signal is derived from the output terminal 16 of the output driver 380, as seen in FIG. 17C.

A still further check is made by the computer system 300 for determining whether a minimum flow condition exists below which the resolution of the system will not provide an accurate indication of flow, by determining if the frequency of the sensing pulses is less than 1 Hz and the frequency of the metering rotor pulse rate is less than 2 Hz for a given period of time, e.g. 1 minute. This represents a normal condition and an indication of that condition is produced by system 300 as will be hereinafter described. Additionally, if the metering rotor pulse rate is less than 2 Hz and the sensing rotor pulse rate is greater than 1 Hz for a continuous period of one minute, this condition is considered to represent a stalled metering rotor condition an indication of which is likewise provided by system 300 as will be hereinafter described.

Thus, the computer system 300 operates to continually calculate the adjusted volume Va and flow rate F, and to continuously check various conditions whereby an indication of a normal or abnormal operating condition is provided.

Figure 18A:
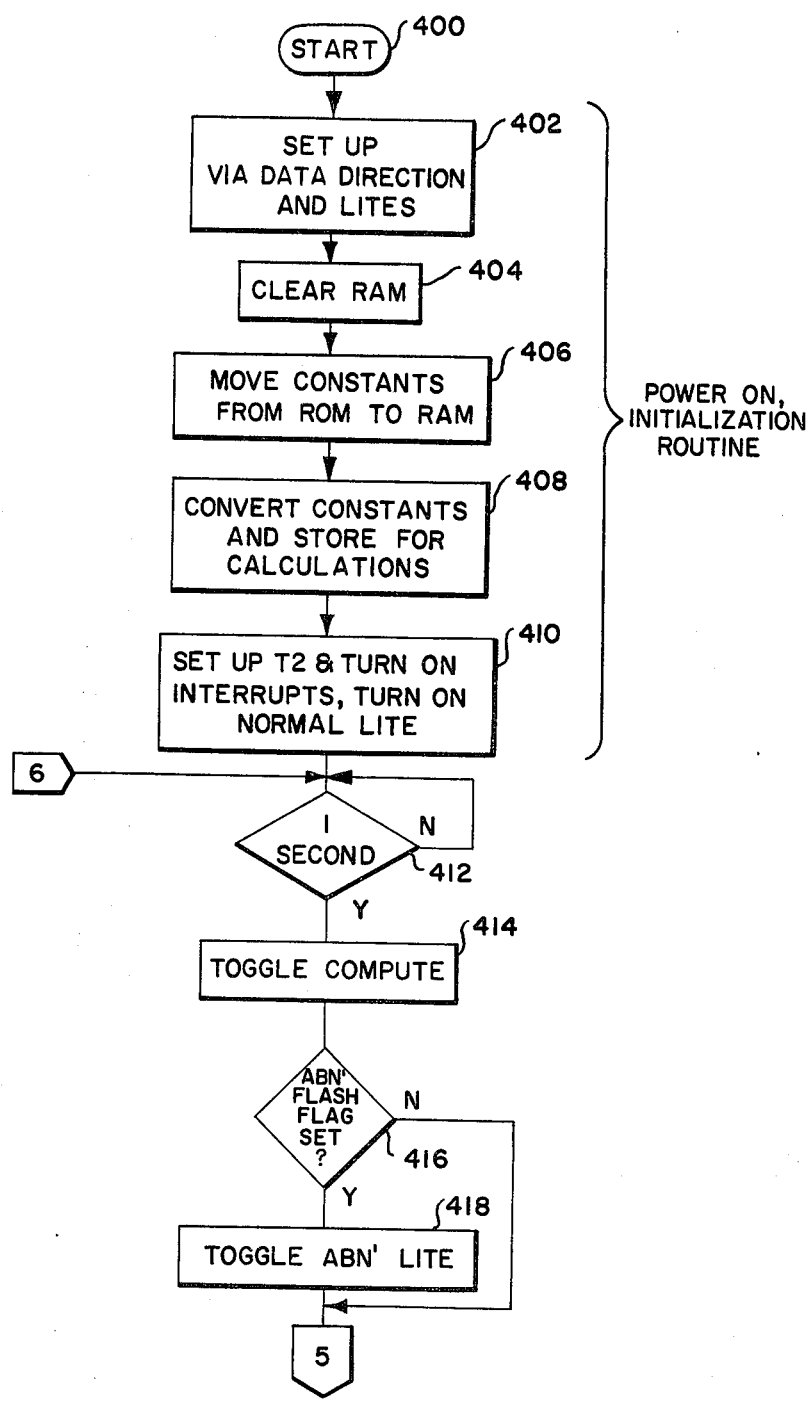
FIGS. 18A through 18F provide flow diagrams of the process as programmed in and executed by the system of FIGS. 13, 17A, 17B and 17C.

Referring now to FIG. 18A to 18F, there will be now described in terms of an illustrative flow diagram, the program as stored within the computer system 300 as generally illustrated in FIGS. 17A, 17B and 17C and in particular within one of its memories 364 or 366. Referring first to FIG. 18A, there is shown an executive program by which the computer system 300 as illustrated in FIGS. 17A, 17B and 17C is "initialized" or "powered up" whenever the initial application of the +5 d.c. power is sensed by the power on reset circuit 374. Proceeding first through the starting point in step 400, step 402 is executed in order that the input/output circuit 306 is conditioned and in particular that its input and output ports are dedicated in terms of receiving and transmitting respectively data and also are conditioned with respect to energizing the appropriate one of the display lights 324, 326 and 328. Next, the memory RAMs 368 and 370 are cleared in step 404. Constants such as the meter factors Km and Ks and the scaling factors including fmax are moved in step 406 from the programmable storage units 314 to the RAMs 368 and 370. In step 408, these constants are used to calculate the frequency factor which is a scaling factor used in steps 518 and 434 described below to provide an indication of the flow rate from the output drive 380 as seen in FIG. 17C. Next, a timer T2, not shown but included within the input/output circuit 306, is initialized to a certain value and allowed to run from pulses originating from the system clock 310 such that repetitive and accurately finitely spaced timing signals are produced which when sensed by the processor 302 will serve as the event which triggers the self-check calculations and various status checks of the meter operation. Specifically, the particular number of pulses derived from the clock circuit 310 are counted in timer T2 in order to define a timing interval, specifically 50 Msec (milliseconds) and the occurrence of the completion of such interval is continuously counted by the processor 302 for 20 periods using timer T3 as described below to generate the 1 second time base necessary for the self-correcting calculation and the no flow and stalled metering rotor checks described herein. Since these above steps occur only when system power is first applied, the steps 400 to 410 may be considered an "initialization" or "power on" routine whereby the system as shown in FIGS. 17A, 17B and 17C are prepared to effect a monitoring process whereby the turbine meter 10 as shown in FIGS. 1 and 2 is made self-correcting in the sense that the indicated output is corrected and self-checked and that various error conditions are detected to provide a manifestation thereof by energizing selected ones of the display lights 324, 326 and 328.

Figure 18B:
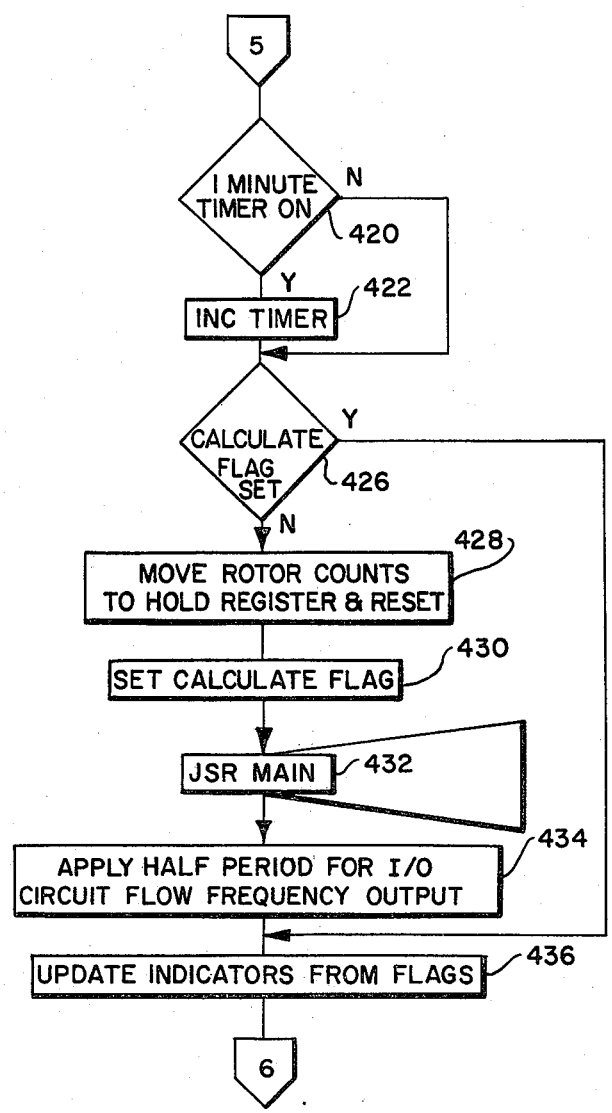

Next, in step 412, the output of the timer T2 is counted by a 1 second software timer T3, not shown but located within one or the other of RAMs 368 or 370 to determine whether 20×50 Msec. pulses have been counted i.e., whether one second has elapsed. If not, a further check is made of the timer T3 until that time at which the timer T3 indicates one second has expired. At that point, a self-checking computation is made as will be explained later and in step 414, the compute display light 324 is toggled. If in the course of the calculations of either of the self-correcting or self-checking routines, as will be described, an abnormal flash flag is set, the abnormal display light 328 will be toggled (switched on and off) in step 418. If not, as decided in step 416, the process moves through transition point 5 to step 420 of FIG. 18B, wherein a 1 minute software time T4, not shown but also located within one of the RAMs 368 or 370, is tested to determine whether it has been turned on by step 446 as described below. If it has, then the count stored in the software timer T4 is incremented by one (representing the passage of 1 second). If the timer T4 has not been turned on, the process moves to step 426 wherein it is determined whether a calculate flag has been set to initiate the calculation of the corrected volume of the self-checking calculations or to merely continue pulse counting. In the particular embodiment described herein, the self-correcting calculations of corrected volume Vc are performed each second, whereas the self-checking calculations are performed upon the occurrence of 25,000 meter rotor pulses Pm. If the calculate flag is not set, the process moves to step 428 wherein the Pm and Ps pulses as derived respectively from the rotor slot sensors 102 and 146 and which were counted during the just completed 1 second time interval defined by timer T3, are shifted from a first set of register Pmi and Psi (interrupt counting registers within which the pulses were initially interrupt counted during the just completed 2 second interval) located within the RAM memories 368 and 370, to a second set of hold registers Pmc and Psc (calculations registers) defined by specific addresses also within the RAM memories 368 and 370. This second set of registers is used in all calculations, while the first set of registers is only used for temporary storage, whereby the counts stored therein may be readily incremented during interrupt processing. Next, the calculate flag is set in step 430 and the process jumps to the main calculation subroutines i.e., the self-checking and self-correcting routines as will be explained. After performing one of the self-checking or self-correcting routines, the program returns to the process as shown in FIGS. 18B, wherein the half period for the flow rate frequency output calculated by step 518 in terms of a clock scaling factor, which is determined in part by the frequency factor calculated in step 408 and metering rotor pulse frequency Pmf is applied to a programmable divider within the input/output circuit 306 in order to provide a scaled output indicative of the flow rate from terminal 16 of the output driver 380. Next, step 436 checks whether any flags have been set which would change the energized states of any of the indicator lights 324, 326 and 328.

Figure 18C:
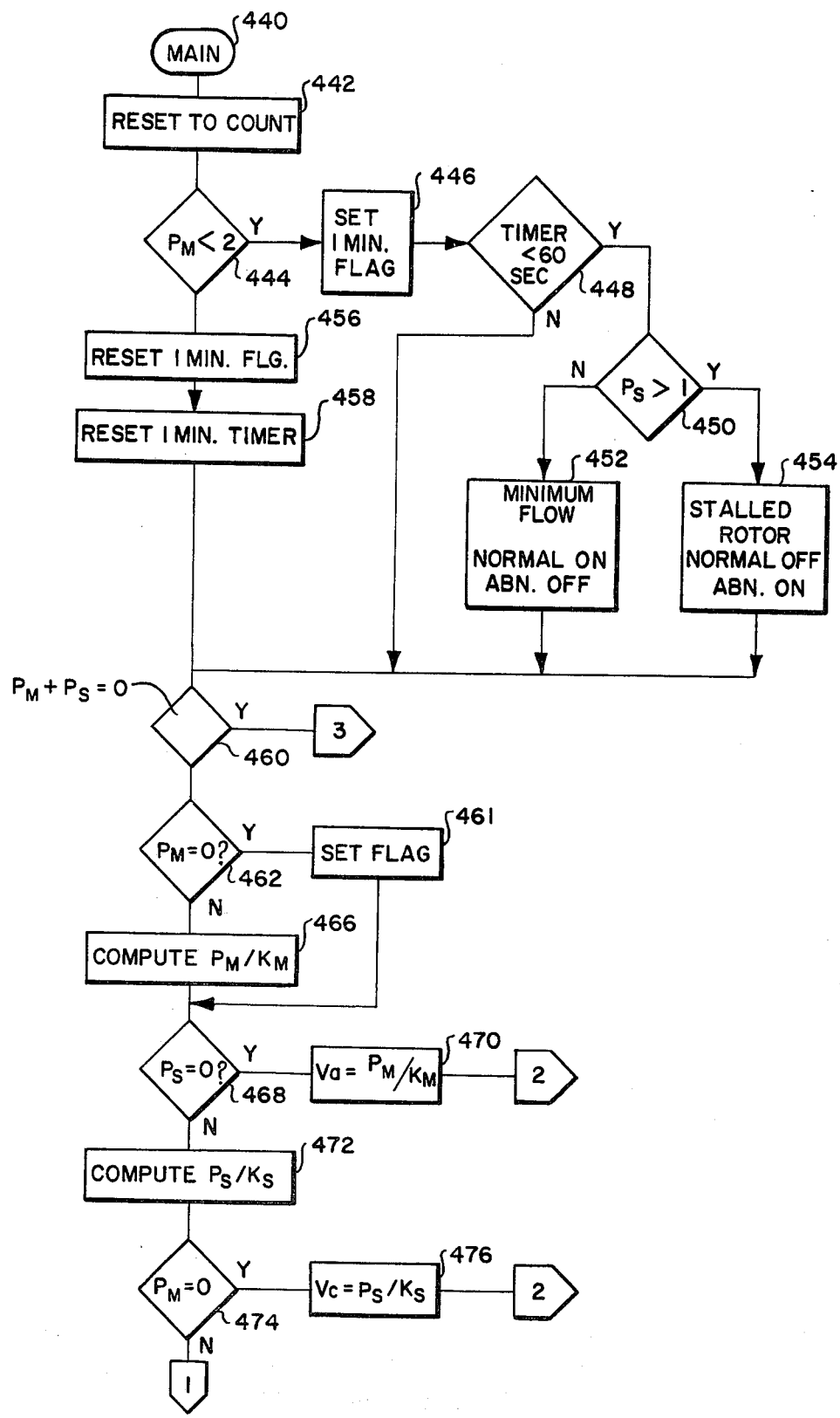

As indicated in FIG. 18B, at step 432, there is a jump to the main calculating subroutine now explained with respect to FIG. 18C. The main calculating subroutine enters through step 440 to first reset by step 442 the first noted set of registers Pmi and Psi of the RAM memories 368 and 370, in preparation for receiving the next series of pulses $P_s$ from the sensing rotor detector 146 and the pulses $p_m$ from the metering rotor detector 102. In the next step, decision step 444, the pulses $p_m$ as transferred to the hold register of the second set of the RAM memories 368 and 370 are examined to see whether the previously accumulated pulse count $P_m$ from the meter rotor is less than 2 indicating that the speed of rotation of the meter rotor 20 has been greatly reduced frm its calibrated value and if so, to set a 1 minute flag to initiate a timing period (timer $T_3$) to determine by step 448 whether the reduced speed condition of the meter rotor 20 continues for the one minute period. Since the pulse accumulation interval has been set to one second by timer $T_3$ via the counting of the recurrence of twenty 50 Msec timing intervals produced by the input/output circuit 306 in conjunction with the system clock 310 by timer $T_2$ the pulses accumulated from both the metering rotor sensors 102 and 146 during this one second interval will equal the frequency of the respective rotor signals. If the reduced speed condition of the metering rotor 20 does not continue for a full minute, the process moves to step 460 and if the condition does persist for one minute, the process moves to step 450 wherein it is determined whether the speed of the sensor rotor 22 as indicated by the pulse count $P_s$ timed over the one second interval is in excess of a predetermined frequency e.g., 1 Hz. If the frequency of the sensor rotor pulses is not above this 1 Hz amount, thereby indicating in conjunction with a low meter rotor pulse frequency as determined in step 444, that the fluid flow through the turbine meter 10 is below the minimum amount for which system 300 will provide adequate resolution, step 452 causes the normal display light 326 to be energized, while maintaining de-energized the abnormal display light 328. On the other hand, if the speed of the sensing rotor 22 is greater than 1 Hz indicating a stalled meter rotor 20, step 454 de-energizes the normal display light 326 and energizes the abnormal display light 328, indicating a malfunction (stalled metering rotor) of the turbine meter 10. If in step 444, it is determined that the meter rotor 20 is rotating above the predetermined minimum, the one minute flag is reset whereby the one minute timer $T_4$ is reinitiated to commence timing a new period, in the event the meter rotor pulse frequency as determined by decision step 444 during a subsequent cycle of program execution becomes less than 1 Hz.

Figure 18D:
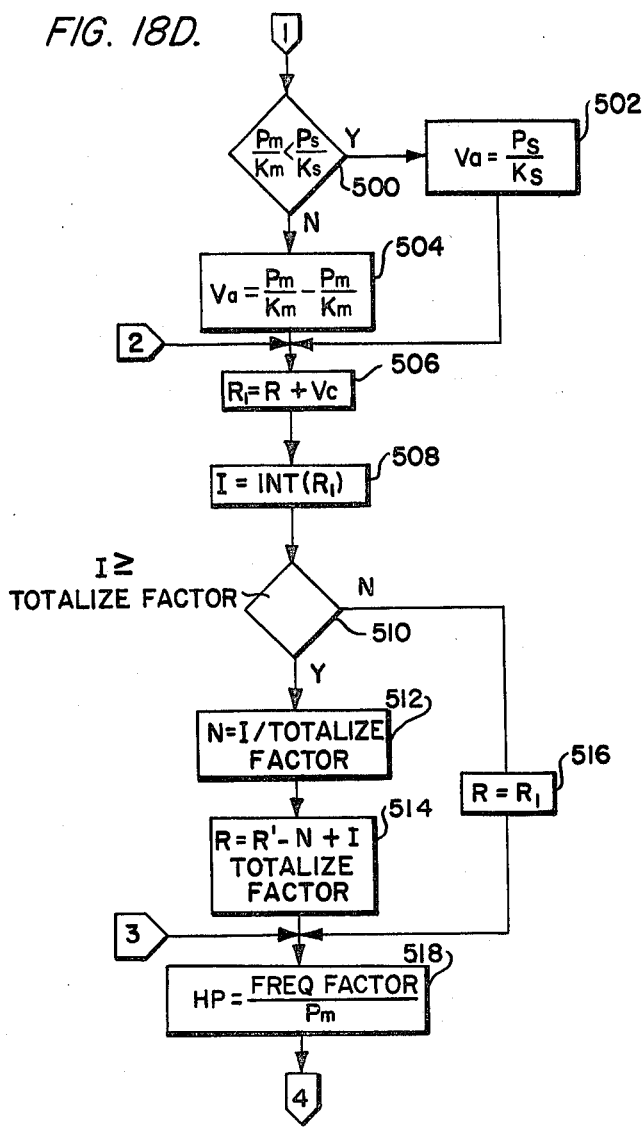

At this point in the process as shown in FIG. 18C, the initial check to determine whether this system is operative or not has been made and the process now moves to calculate the corrected volume $V_c$ in accordance with equation 38 set out above. In particular, step 460 determines whether both of the accumulated metering rotor pulses Pm or sensing rotor pulses Ps equals zero indicating that each of the metering and sensing rotors 20 and 22 are at a standstill and if so, the process exits via transfer point 3. If not, step 462 determines whether only the meter rotor pulses Pm equals zero and if so, step 464 sets a flag indicating that the meter rotor 20 is at a standstill indicating that there is no flow through the meter 10 which may result from a stalled meter rotor 20 or perhaps a fault in the sensor 102 or in the system leading from sensor of detector 102. If Pm does not equal zero as determined by step 462, an indication is provided that the metering rotor 20 is rotating. If at that time the sensing rotor 22 is at a standstill, there are no sensing rotor pulses and the routine as shown in FIG. 18C is capable of short cutting the calculations of corrected volume $V_c$. First, in step 466, the value of $P_m/K_m$ is calculated to be used in a manner to be described later. Next, in step 468, a decision is made as to whether the number of pulses $P_s$ equals to zero, i.e., there are no sensing rotor pulses, and if yes, the value of $P_m/K_m$ as calculated in step 466 is assigned by step 470 to be the corrected volume $V_c$, since the value of the factor Ps/Ks (equation 38) is zero for the condition where $P_s$ equals zero. At this point, the routine exits via point 2, whereby certain steps of calculations as would otherwise be required will not be performed. Proceeding from step 468, step 472 calculates the value of $P_s/K_s$. If in step 474, it is decided that there are no pulses derived from the metering rotor, i.e., $P_m$ equals zero, then the value of $P_s/K_s$ is assigned by step 476 as the value of the correct volume $V_c$ and similarly, the routine exits via point 2 to the subroutine as shown in FIG. 18D, whereby certain steps in the process will not be performed and thus computing time may be reduced. If there are sensing rotor pulses $P_s$ as decided by 468 and if there are metering rotor pulses $P_m$ as decided by step 474, then step 474 branches via exit point 1 to the subroutine as shown in FIG. 18D. In this latter case, it is then necessary to proceed through the entire subroutine as shown in FIG. 18D; whereas if there are either no sensing rotor pulses or no metering rotor pulses, the routine exits via one of the exit points 2 to thereby eliminate a number of the calculating or processing steps as shown in FIG. 18D. As shown in FIG. 18C, this saving of calculation time is achieved in part by splitting up of the calculation of the values $P_m/K_m$ and $P_s/K_s$.

The exit points 1, 2 and 3 from the routine of FIG. 18C transfer the process to various points of the subroutine as shown in FIG. 18D. If both metering and sensing rotor pulses are determined by steps 462 and 468 to exist the process enters via transfer point 1 to step 500, wherein it is determined whether the factor $P_m/K_m$ is less than the factor $P_s/K_s$, and if not, the corrected volume $V_c$ is calculated in step 504 in accordance with equation 38. In a particular abnormal situation where the performance of the metering rotor is degraded to the point where the factor $P_s/K_s$ exceeds the factor $P_m/K_m$ as determined by step 500, an approximation of the correct volume $V_c$ is made in step 502 wherein the previously calculated value of $P_s/K_s$ is assigned as the approximated value of $V_c$. At this point in the process as shown in FIG. 18D, a value of $V_c$ has been calculated in either step 504 or 502, or one of steps 470 or 476 as shown in FIG. 18C.

It will now be understood that the process described above calculates the corrected volume of fluid $V_c$ at the end of each 1-second interval which was passed through the meter during that interval. If the value of $V_c$ for that interval is not sufficient to increment register 322, that value of $V_c$ will be stored in RAMs 368 and 370 as remainder R which will be added to the results of the $V_c$ calculation performed at the end of the next succeeding 1-second interval.

Now, it is necessary to determine whether the value of the total corrected volume including remainder R from the preceeding interval is sufficient to increment the mechanical totalizer 322 as shown in FIG. 15. If so, the electromechanical totalizer 322 will be incremented. First, by step 506, the remainder R, which is the left over fraction of the totalizer factor that may have existed at the conclusion of all incrementations of the totalizer 322 due to the previous corrected volume calculations, is added to the newly calculated value of corrected volume $V_c$ that was calculated for the just completed interval of one second to produce the total volume $R_1$ to be compared with the totalizer factor. The totalizer factor is the volume e.g., 10 cu. ft., that is necessary to increment by one the electromechanical totalizer 322. Next, step 508 takes the integer I of the newly calculated value of $R_1$. The integer value I is then compared to see whether it is equal to or greater than the totalizer factor, and if so, the number of increments N of the electromechanical totalizer 322 is determined in step 512. The new remainder R which is stored for use in the immediately following corrected volume calculation is determined in step 514 as the difference between $R_1$ and $N \times I$. If the volume as represented by the value of integer I is less than the totalizer factor then the newly calculated adjusted volume $R_1$ is saved for use in the immediately following corrected volume calculation by being stored in the RAM memories 368 and 370 in the location set aside for R. The process continues in step 518 (FIG. 18B) to calculate the new half period count which is a scaling factor that is applied to the input/output circuit 306 through step 434 to produce the frequency based flow rate output signal given by equation 41.

Figure 18F:
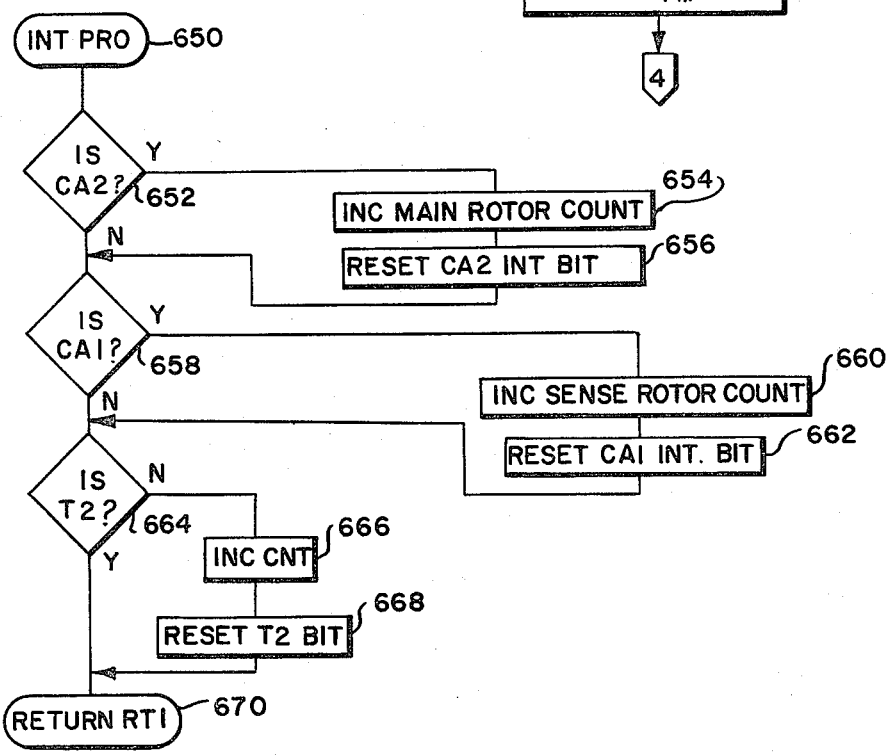
Figure 18E:
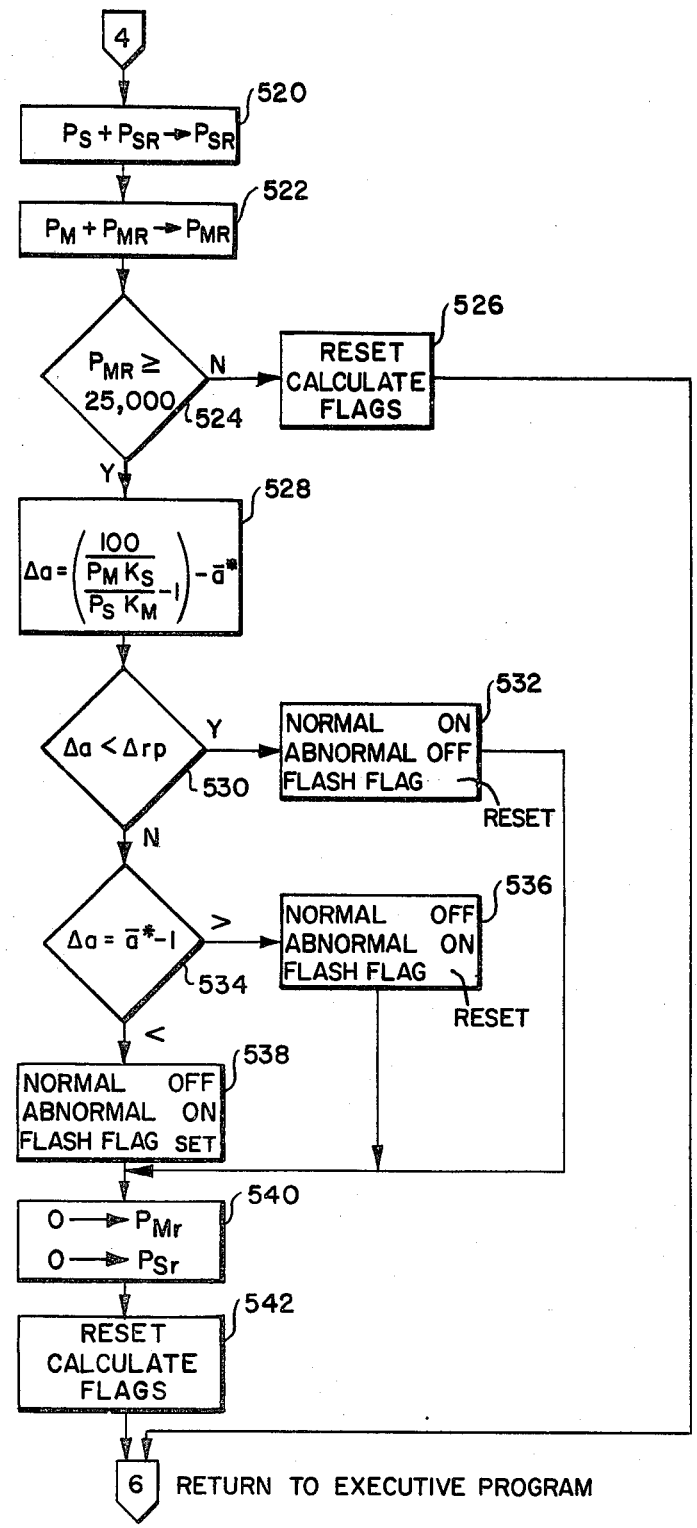

At this point, the process moves via transfer point 4 to the self-checking subroutine as shown in FIG. 18E, wherein the system determines whether it is operating normally or abnormally and provides a corresponding indication by energizing the corresponding display lights 324, 326 and 328. In steps 520 and 522, the meter and sensor pulse counts Pm and Ps are continuously transferred from the first set of hold registers Psi and Pmi into a further third set of storage registers, Psr and Pmr (pulse accumulation registers) respectively of the RAM memories 368 and 370, and are accumulated with the previous contents of these registers until 25,000 meter rotor pulses have been counted. This third set of storage registers is necessary since several program sampling cycles are necessary for the 25,000 meter pulse count accumulation to occur. In this regard, it is preferred to permit a relatively long period of time to occur between the self-checking calculations in that the accuracy of the self-checking calculations or steps is improved. In an illustrative example, where the system 300 and in particular the microprocessor 302 responds to the clock signal derived from the system clock circuit 310 to perform a self-correcting calculation each second, the system as explained above counts 25,000 meter pulses which will require approximately 50 seconds at maximum flow rate. Thereafter, a determination is made in step 524 whether the number of meter pulses Pmr is greater than 25,000 and if so, the various self-checking calculations are initiated to determine whether the meter system is operating correctly. If 25,000 metering rotor pulses have not been accumulated then the process proceeds to step 526 where the calculate flag is reset and pulse counting in the Pm and Ps registers continues. Upon the detection of the occurrence of the predetermined number e.g., 25,000 meter pulses, the contents of the holding registers of the third set, Pmr and Psr and the process initiates the self-checking calculation, namely, solving the equation 40 given above for the deviation from calibrated conditions in terms of $\Delta \alpha$ as by step 528. Next, the deviation value $\Delta \alpha$ is compared to the initially programmed sub-limit $\Delta \alpha p$ of the acceptable deviation value, and if within acceptable sub-limits, step 532 energizes the normal display light 526 while deactivating the abnormal light 328. If the calculated deviation $\Delta \alpha$ is greater than the predetermined value $\Delta \alpha p$, step 534 makes a further decision to determine whether the deviation value $\Delta \alpha$ is greater or less than the limit $(\bar{\alpha}^* - 1)$ and if less, step 538 de-energizes the normal light 326, while causing the abnormal light 328 to flash on and off to indicate that the limit has not been exceeded but the $\Delta \alpha p$ value has been exceeded. If the amount of deviation $\Delta \alpha$ is greater than the limit as determined by step 534, step 536 de-energizes the normal display light 326 while continuously energizing the abnormal light 328 to indicate a more severe condition of meter failure. Use of the "flashing" condition is facilitated by the "flash" flag as given in step 538 the status of which is tested in step 416 to physically cause the abnormal indicator 328 to toggle. Thereafter in step 540, the third set of holding registers for accumulating the metering rotor pulses Pmr and the sensing rotor pulses Psr are reset to zero, before resetting the calculate flag in step 542, and returning to the entry location 412 of the overall executive program.

Referring now to FIG. 18F, there is shown a subroutine for allowing the system to accept and process any one of three possible interrupts. At the occurrence of an interrupt the process jumps from any instruction location in the entire program as shown in FIG. 18A through 18E to the entry point 650 of the interrupt processing routine. In step 652, a first determination is made of whether an input pulse has been produced by the metering rotor encoder via input CA2 of the input-/output device 306. If a meter pulse has been generated, the register in RAM memories 368 or 370 which has been set aside for the metering rotor pulses and previously referred to as Pmi is incremented by one in step 654 and a signal acknowledging same is sent to the input/output circuit 306 to reset the interrupt line associated with the input CA2 such that any subsequent metering rotor pulse will be acknowledged and processed by the system. Similarly, in step 658, a determination is made whether an input is applied to the CA1 terminal of the input/output device 306 and if so, the sensing rotor pulse register Psi of the first set which is contained in RAMs 368 and 370 is incremened by 1 and likewse an acknowledgment reset signal is sent to reset the interrupt line associated with the input CA1. Thereafter, the determination is made by step 664 whether the timer T3 has completed its 50 Msec timing cycle and if so, the 1 second software timer $T_2$ which is tested by clock 412 is incremented one by step 666 before applying a reset signal to the interrupt line associated with the timer T3 so as to allow the occurrence of the completion of the next 50 Msec timing cycle to be sensed by the system. At the culmination of this interrupt processing routine, the program returns to the next instruction following the instruction immediately preceding the occurrence of the interrupt.

The foregoing describes a meter and implementing electronic system which will provide an indication of fluid flow through the meter which is continuously corrected to calibrated values even though the speed of the metering rotor has departed from its calibrated value, and which provides an indication when either the metering rotor speed or sensing rotor speed or both have deviated from calibrated values beyond pre-set limits. It will be understood that the inventions described herein are equally useful in the metering of gaseous fluids as in the metering of liquid fluids.

I claim:

1. A turbine meter comprising a housing, a metering rotor having spaced blades and mounted for rotation in said housing in response to the flow of fluid through said meter, output means actuated by said metering rotor to provide an output indicative of the fluid flow through said metering rotor, a sensing rotor downstream of said metering rotor for sensing the exit angle of the fluid leaving the blades of said metering rotor, said sensing rotor having blades oriented at a discrete angle with respect to the axis of rotation of said sensing rotor and being adapted for normally continuous rotation at a speed substantially less than the speed of said metering rotor, means actuated by said sensing rotor for modifying the output from said metering rotor in accordance with changes in said exit angle.

2. The turbine meter defined in claim 1 in which said sensing rotor is adapted to rotate in the same direction as said metering rotor.

3. The turbine meter defined in claim 1 in which the speed of said sensing rotor is one order of magnitude less than the speed of said metering rotor.

4. The turbine meter defined in claim 3 in which said sensing rotor is adapted to rotate in the same direction as said metering rotor.

5. A turbine meter comprising a housing, a metering rotor having spaced blades and mounted for rotation in said housing in response to the flow of fluid through said meter, means actuated by said metering rotor to provide a first signal representative of the speed of said metering rotor, a sensing rotor downstream of said metering rotor, said sensing rotor having blades oriented at a discrete angle with respect to the axis of rotation of said sensing rotor and being adapted for normally continuous rotation at a speed substantially less than the speed of said metering rotor, means actuated by said sensing rotor to provide a second signal representative of said exit angle, means for combining the values of said signals to produce an output indicative of the performance of said meter.

6. The turbine meter of claim 5 in which said last mentioned means comprises means to subtract the value of the signal representative of said exit angle from the value of the signal representative of the speed of said metering rotor to provide an output indicative of the fluid flow through the meter.

7. The turbine meter defined in claim 5 in which the speed of said sensing rotor is one order of magnitude less than the speed of said metering rotor.

8. A turbine metering system comprising a housing, a metering rotor having spaced blades and mounted for rotation in said housing in response to the flow of fluid through said meter, means actuated by said metering rotor to provide a first output having a value representative of the speed of rotation of said metering rotor, a sensing rotor downstream of said metering rotor for sensing the exit angle of the fluid leaving said metering rotor, said sensing rotor having blades oriented at a discrete angle with respect to the axis of rotation of said sensing rotor and being adapted for normally continuous rotation at a speed substantially less than the speed of said metering rotor, means actuated by said sensing rotor to provide a second output having a value representative of the speed of rotation of said sensing rotor, means to make a comparison the values of said first and second output.

9. The turbine meter defined in claim 8 in which the speed of rotation of said sensing rotor is one order of magnitude less than the speed of said metering rotor.

10. The turbine meter defined in claim 8 together with means to compare the value of said comparison with a pre-selected range of values and means to provide an output when the value of said comparison is not within said preselected range of values.

11. The turbine meter of claim 10 together with means to adjust the limits of said preselected range of values.

12. A turbine meter comprising a housing, a metering rotor having spaced blades and mounted for rotation in said housing in response to the flow of fluid through said meter, means actuated by said metering rotor to provide a first signal representative of the speed of said metering rotor, a sensing rotor downstream of said metering rotor adapted for rotation in the same direction as said metering rotor for sensing the exit angle of the fluid leaving said metering rotor, means actuated by said sensing rotor to provide a second signal representative of said exit angle, means to subtract the value of said second signal from the value of said first signal to produce an output representative of fluid flow through said meter.

13. A turbine meter comprising a housing, metering rotor having spaced blades and mounted for rotation in said housing in response to the flow fo fluid through said meter, means actuated by said metering rotor to provide a first signal representative of the speed of said metering rotor, a sensing rotor downstream of said metering rotor adapted for rotation in the same direction as said metering rotor for sensing the exit angle of the fluid leaving said metering rotor, means actuated by said sensing rotor to provide a second signal representative of said exit angle, means to make a comparison of the values of said first and second signals and means to compare the value of said comparison with a preselected range of values and means to provide a signal when the value of said comparison is not within said preselected range of values.

14. The turbine meter of claim 13 together with means to adjust the limits of said pre-selected range of values.

15. A turbine metering system comprising a housing, a metering rotor having spaced blades and mounted for rotation in said housing in response to the flow of fluid through said meter, means actuated by said metering rotor to provide a first output having a value representative of the speed of rotation of said metering rotor, a sensing rotor downstream of said metering rotor mounted for normally continuous rotation in the same direction as said metering rotor and at a speed which varies with the value of the exit angle of the fluid leaving said metering rotor, means actuated by said sensing rotor to provide a second output having a value representative of the speed of rotation of said sensing rotor, means to subtract the value of said second output from the value of said first output, and means to produce a third output the value of which is representative of the difference between the values of said second and first outputs.

16. A turbine metering system comprising a housing, a metering rotor having spaced blades and mounted for rotation in said housing in response to the flow of fluid through said meter, said actuated by said metering rotor to provide a first output having a value representative of the speed of rotation of said metering rotor, a sensing rotor downstream of said metering rotor mounted for rotation in the same direction as said metering rotor and at a speed which varies with the value of the exit angle of the fluid leaving said metering rotor, means actuated by said sensing rotor to provide a second output having a value representative of the speed of rotation of said sensing rotor, means to make a comparison of values of said first and second outputs and means to compare the value of said comparison with a preselected range of values and means to provide an output when the value of said comparison is not within said preselected range of values.

17. The turbine meter of claim 16 together with means to adjust the limits of said pre-selected range.

18. A turbine meter comprising a housing, a metering rotor having spaced blades and mounted for rotation in said housing in response to the flow of fluid through said meter, means actuated by said metering rotor to provide a first output representing registration differing from 100% registration, sensing means downstream of said metering rotor for sensing the exit angle of the fluid leaving said metering rotor, means actuated by said sensing means provide a second output representative of the amount by which said first output is representative of registration differing from 100%, means to subtract the value of said second output from the value of said first output, and means to provide a third output representative of the difference between the values of said first and second output.

19. The turbine meter defined in claim 18 in which said first output is representative of registration greater than 100%.

20. A turbine meter comprising a housing, a metering rotor having spaced blades and mounted for rotation in said housing in response to the flow of fluid through said meter, means actuated by said metering rotor to provide a first output representative of registration in excess of 100% registration, sensing means downstream of said metering rotor for sensing the exit angle of the fluid leaving said metering rotor, means actuated by said sensing means to provide a second output representative of the amount by which said first output is representative of registration in excess of 100% registration, means to make a comparison of the values of said first and second outputs.

21. The turbine meter defined in claim 20 together with means to compare the value of said comparison with a pre-selected range of values and means to provide an output when the value of said comparison is not within said pre-selected range of values.

22. A turbine meter defined in claim 21 together with means to adjust the limits of said preselected range.

23. A turbine meter comprising a housing, a metering rotor having spaced blades and mounted for rotation in said housing in response to the flow of fluid through said meter, first pulse producing means actuated by said metering rotor to produce a given number of pulses per revolution of said metering rotor, a sensing rotor downstream of said metering rotor for sensing the exit angle of fluid leaving the blades of said metering rotor, second pulse producing means actuated by said sensing rotor to produce a given number of pulses per revolutions of said sensing rotor, first counting means responsive to a preselected number of pulses from said second pulse producing means, second counting means for counting the number of pulses from said first pulse producing means during the time period it takes for said first counting means to count said preselected number of pulses from said second pulse producing means, means to produce an output representative of the number of pulses counted by said second counting means during said time period, and means to produce an output representative of said preselected number of pulses counted by said first counting means.

24. The turbine meter defined in claim 23 together with means to subtract the value of said last mentioned output from the value of said first mentioned output.

25. The turbine meter defined in claim 23 together with means to make a comparison of the values of said outputs.

26. A turbine meter comprising a housing, a metering rotor having spaced blades and mounted for rotation in said housing in response to the flow of fluid through said meter, first pulse producing means actuated by said metering rotor to produce a preselected number of pulses for a given number of revolutions of said metering rotor, a sensing rotor downstream of said metering rotor for sensing the exit angle of fluid leaving the blades of said metering rotor, second pulse producing means actuated by said sensing rotor to produce a preselected number of pulses for a given number of revolutions of said sensing rotor, first counting means responsive to a pre-selected number of pulses from said first pulse producing means, second counting means controlled by said first counting means for counting the number of pulses from said second pulse producing means during the time period it takes said first counting means to count said pre-selected number of pulses from said first pulse producing means, means to produce an output representative of the number of pulses counted by said second counting means during said time period, and means to produce an output representative of said pre-selected number of pulses counted by said first counting means.

27. The turbine meter defined in claim 26 together with means to subtract the value of said last mentioned output from the value of said first mentioned output.

28. The turbine meter defined in claim 26 together with means to make a comparison of the values of said outputs.

29. A turbine meter comprising a housing, a metering rotor having spaced blades and mounted for rotation in said housing in response to the flow of fluid through said meter, first pulse producing means actuated by said metering rotor to produce a pre-selected number of pulses for a given number of revolutions of said metering rotor, a sensing rotor downstream of said metering rotor for sensing the exit angle of fluid leaving the blades of said metering rotor, second pulse producing means actuated by said sensing rotor to produce a preselected number of pulses for a given number of revolutions of said sensing rotor, first time controlled counting means for counting the number of pulses received from said first pulse producing means during a given time interval, second time controlled counting means for counting the number of pulses received from said second pulse producing means during said time interval, means to produce an output representative of the number of pulses counted by said first time controlled counting means during said time interval, and means to produce an output representative of the number of pulses counted by said second time controlled counting means during said time interval.

30. The turbine meter defined in claim 29 together with means to subtract the value of said last mentioned output, from the value of said first mentioned output.

31. The turbine meter defined in claim 29 together with means to make a comparison of the values of said outputs.

32. A self-correcting metering system for providing an accurate manifestation of fluid flow through a meter corrected to compensate for conditions of use, said system comprising:
   a. a metering rotor mounted for rotation in response to the flow of fluid through said meter;
   b. a sensing rotor disposed downstream of said metering rotor and mounted for rotation at a speed dependent upon the value of the exit angle of the fluid leaving said metering rotor;
   c. first means responsive to the rotation of said metering rotor for providing a first output indicative of the rotational speed of said metering rotor;
   d. second means responsive to the rotation of said sensing rotor for providing a second output indicative of the rotational speed of said sensing rotor; and
   e. processing means comprising means responsive to the first and second outputs for providing respectively a first signal representative of fluid flow which differs from 100% registration of the volume of the fluid flowing through said meter and a second signal representative of the amount that said first signal differs from 100% registration of the volume of the fluid flow through said meter and means for obtaining the difference between the values of said first and second signals to provide an accurate indication of the volume of fluid flowing through said meter.

33. The metering system as claimed in claim 32, wherein said processing means comprises a digital computer processor and memory means.

34. The metering system as claimed in claim 33, wherein said first means is coupled to said metering rotor to provide a first series of pulses whose frequency is dependent upon the speed of said metering rotor, and said second means is coupled to said sensing rotor for providing a second series of pulses whose frequency is dependent upon the speed of said sensing rotor.

35. The metering system as claimed in claim 34, wherein said processing means includes means for counting each of said first and second series of pulses for a given time interval to provide respectively first and second indications of the volume of fluid flow during said given interval.

36. The metering system as claimed in claim 35, wherein said memory means stores a metering rotor factor dependent upon the number of pulses produced by said metering rotor at calibration for each unit of volume passed through said meter, and a sensing rotor factor dependent upon the number of pulses produced by said sensing rotor at calibration for each unit of volume passed through said meter.

37. The metering system as claimed in claim 36, wherein said control means comprises first means for processing said first signal with said metering rotor factor to provide an offset manifestation of the volume of fluid flow through the meter for said given interval and for processing said second signal with said sensing rotor factor to provide a second offset manifestation of the volume of fluid flow through said meter for said given interval.

38. The metering system as claimed in claim 37, wherein said metering rotor factor is selected to provide a manifestation of fluid flow in excess of the actual flow through said meter at initial calibration, and the sensing rotor factor is selected to provide a manifestation of flow which is equal to the excess manifestation of fluid flow provided by said metering rotor such that the actual flow at calibration is equal to the difference between the values of the manifestations provided by said metering rotor and said sensing rotor.

39. A self-checking metering system for providing an indication of change in rotor performance from an initially calibrated value comprising:
   (a) a metering rotor mounted for rotation in response to the flow of fluid through said meter;
   (b) a sensing rotor mounted downstream of said metering rotor for rotation at a speed dependent upon the value of the exit angle of the fluid leaving said metering rotor, said sensing rotor having blades oriented at a discrete angle with respect to the axis of rotation of said sensing rotor;
   (c) first means responsive to the rotation of said metering rotor for providing a first signal indicative of the rotational speed of said metering rotor;
   (d) second means responsive to the rotation of said sensing rotor for providing a second signal indicative of the rotational speed of sensing rotor; and
   (e) processing means including first processor means responsive to the first and second signals for obtaining a first ratio signal indicative of the ratio of the current rotational speed of said metering rotor to the current rotation speed of said sensing rotor, second processor means for providing a second ratio signal indicative of the ratio of the rotational speed at calibration of said metering rotor and the rotational speed at calibration of said sensing rotor, and a means for obtaining the difference between the first and second ratio signals to provide an indication of the change in rotor performance between calibration and current operation.

40. The self-checking metering system as claimed in claim 37, wherein said first means generates the first signal as a series of pulses whose frequency is dependent upon the rotational speed of said metering rotor and said second means generates the second signal as a series of pulses dependent upon the rotational speed of said sensing rotor.

41. The self-checking metering apparatus as claimed in claim 37, wherein said processing means includes counting means for counting each of the first and second series of pulses for a given interval to provide a first count manifestation and a second count manifestation, and means for processing each of said first and second count manifestations with a metering rotor factor and a sensing rotor factor respectively to provide first and second volume manifestations respectively, said first means for obtaining a first ratio of the first and second current volume manifestations and second means for obtaining a second ratio of the first and second volume manifestations at calibration.

42. The self-checking metering system as claimed in claim 39, wherein said processing means further comprises storge means for storing limit values of the difference between said first and second ratios and means for comparing the change in rotor performance with the stored limit values and if not within said stored limit values, means to provide a manifestation thereof.

43. A self-correcting and checking metering system comprising:
  (a) a meter rotor mounted for rotation in response to the flow of fluid through said meter;
  (b) a sensing rotor disposed downstream of said metering rotor and mounted for rotation at a speed dependent upon the value of the exit angle of the fluid leaving said metering rotor;
  (c) first means responsive to the rotation of said metering rotor for providing a first series of pulses whose frequency is indicative of the rotational speed of said metering rotor;
  (d) second means responsive to the rotation of said sensor rotor for providing a second series of pulses whose frequency is indicative of the rotational speed of said sensing rotor; and
  (e) processing means comprising a clock for generating a series of timing signals, the interval there between defining a counting interval; means for counting each of the first and second series of pulses for said intervals to provide respectively first and second volume manifestations; storage means for storing a metering rotor factor determined at calibration and a sensing rotor factor determined at calibration; calculation means for periodically processing said first volume manifestation and said metering rotor factor to provide a first calibrated offset manifestation of the volume of the fluid flow through said meter and for processing said second volume manifestation and said sensing rotor factor to provide a second calibrated offset manifestation of the volume of the fluid flow through said meter; first means for obtaining the difference between said first and second offset manifestations to provide a manifestation of the actual volume of the fluid flowing through said meter; means responsive to the first and second series of pulses for obtaining a first ratio signal indicative of the ratio of the present rotational speed of said metering rotor to the present rotational speed of said sensing rotor; means responsive to the first and second series of pulses for obtaining a second ratio signal indicative of a ratio of the rotational speed at calibration of said metering rotor and the rotational speed at calibration of said sensing rotor; and second means for obtaining the difference between the first and second ratio signals to provide an indication of the change of rotor performance between calibration and its present operation.

44. The self-correcting and checking metering system as claimed in claim 43, wherein said first difference means is operative in response to each of the series of clock timing signals to effect its calculation of the volume difference.

45. A self-correcting and checking metering system as claimed in claim 43, wherein said processing means further comprises means responsive to a predetermined number of pulses of said second series to initiate the operation of said second difference means to obtain an indication of the change in the performance of either or both.

46. The self-correcting and checking metering system as claimed in claim 45, wherein said storage means stores limit values of the difference between said first and second ratio signals and means for comparing the ratio difference with the stored limit values and if not within said stored limit values means to provide a manifestation thereof.

47. A turbine meter comprising a metering rotor having blades oriented to form an angle with respect to the axis of rotation of said metering rotor, means actuated by said metering rotor for providing a first electric signal representative of the speed of said metering rotor, a sensing rotor downstream from said metering rotor for sensing the exit angle of the fluid leaving said metering rotor and having blades oriented to form an angle with respect to the axis of rotation of said sensing rotor, said last mentioned angle being substantially less than said first mentioned angle, means actuated by said sensing rotor for providing a second electrical signal representative of the speed of said sensing rotor, means for combining the values of said first signal and said second signal to produce a third electric signal representative of the value of fluid flow through said meter.

48. The turbine meter defined in claim 47 in which said last mentioned means is comprised of means to subtract said second signal from said first signal.

49. A turbine meter comprising a metering rotor having blades oriented to form an angle with respect to the axis of rotation of said metering rotor for providing a first electric signal representative of the speed of said metering rotor, a sensing rotor downstream from said metering rotor for sensing the exit angle of the fluid leaving said metering rotor and having blades oriented to form an angle with respect to the axis of rotation of said sensing rotor, said last mentioned angle being substantially less than said first mentioned angle, means actuated by said sensing rotor for providing a second electric signal representative of the speed of said sensing rotor, means for comparing the values of said first and second signals and means to produce a third signal representative of the value of said comparison.

50. The turbine meter defined in claim 49 in which said means for comparing the value of said first and second signals is comprised of means to take the ratio of the values of said first and second signals.

51. A turbine meter comprising a housing, a metering rotor having spaced blades and mounted for rotation in said housing in response to the flow of fluid through said meter, means to minimize the tangential component in the direction of fluid flow into said metering rotor, output means actuated by said metering rotor to provide a first output representative of the fluid flow through said metering rotor, sensing means downstream of said metering rotor for sensing the exit angle of the fluid leaving the blades of said rotor, said sensing means comprising a sensing rotor adapted to rotate in the same direction as said metering rotor at calibration, means actuated by said sensing means to provide a second output representative of the value of said exit angle and means to subtract the value of said second output from the value of said first output to produce a third output representative of the flow through said meter compensated for deviations in the performance of said metering rotor from its performance at calibration.

52. A turbine meter comprising a housing, a metering rotor having spaced blades and mounted for rotation in said housing in response to the flow of fluid through said meter, output means actuated by said metering rotor to provide an output indicative of the fluid flow through said metering rotor, a sensing rotor downstream of said metering rotor for sensing the exit angle of the fluid leaving the blades of said metering rotor, said sensing rotor being adapted for normally continuous rotation in the same direction as said metering rotor and at a speed substantially less than the speed of said metering rotor, and means actuated by said sensing rotor for modifying the output from said metering rotor in accordance with changes in said exit angle.

53. The turbine meter defined in claim 52 in which the speed of said sensing rotor is one order of magnitude less than the speed of said metering rotor.

54. A tubine meter comprising a housing, a metering rotor having spaced blades and mounted for rotation in said housing in response to the flow of fluid through said meter, means actuated by said metering rotor to provide a first signal representative of the speed of said metering rotor, a sensing rotor downstream of said metering rotor for sensing the exit angle of the fluid leaving said metering rotor, said sensing rotor being adapted for normally continuous rotation at a speed substantially less than the speed of said metering rotor, means actuated by said sensing rotor to provide a second signal representative of said exit angle and means to subtract the value of the signal representative of said exit angle from the value of the signal representative of the speed of said metering rotor to provide an output indicative of the fluid flow through the meter.

* * * * *